United States Patent
Ikeda et al.

(10) Patent No.: US 9,382,434 B2
(45) Date of Patent: *Jul. 5, 2016

(54) ACTINIC RADIATION-CURABLE INKJET INK AND IMAGE FORMING METHOD USING SAME

(71) Applicant: Konica Minolta, Inc., Tokyo (JP)

(72) Inventors: Masashi Ikeda, Tokyo (JP); Satoshi Masumi, Kanagawa (JP); Toshiyuki Takabayashi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 71 days.

This patent is subject to a terminal disclaimer.

(21) Appl. No.: 14/366,471

(22) PCT Filed: Dec. 19, 2012

(86) PCT No.: PCT/JP2012/008130
§ 371 (c)(1),
(2) Date: Jun. 18, 2014

(87) PCT Pub. No.: WO2013/094198
PCT Pub. Date: Jun. 27, 2013

(65) Prior Publication Data
US 2015/0015648 A1   Jan. 15, 2015

(30) Foreign Application Priority Data
Dec. 19, 2011   (JP) ................................. 2011-277211

(51) Int. Cl.
*B41J 2/21*       (2006.01)
*C09D 11/107*     (2014.01)
(Continued)

(52) U.S. Cl.
CPC ............. *C09D 11/107* (2013.01); *B41J 2/2107* (2013.01); *C09D 11/101* (2013.01); *C09D 11/30* (2013.01); *B41M 7/0081* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ...................................................... 347/95–105
See application file for complete search history.

(56) References Cited

U.S. PATENT DOCUMENTS

| | | | |
|---|---|---|---|
| 8,124,791 B2 * | 2/2012 | Shinjo ................... | C08F 222/40 548/520 |
| 2006/0025498 A1 * | 2/2006 | Fukushige ............ | C03C 17/006 523/160 |

(Continued)

FOREIGN PATENT DOCUMENTS

| | | |
|---|---|---|
| JP | 2007-056232 A | 3/2007 |
| JP | 2008-213450 A | 9/2008 |

(Continued)

*Primary Examiner* — Manish S Shah
(74) *Attorney, Agent, or Firm* — Lucas & Mercanti, LLP

(57) ABSTRACT

Provided is an actinic radiation-curable inkjet ink that undergoes sol-gel phase transfer and contains a dye, a gelling agent, a photopolymerization compound and a photopolymerization initiator. The actinic radiation-curable inkjet ink includes a photopolymerizable compound A, which is a (meth)acrylate having hydroxyl groups; a photopolymerizable compound B, which is a (meth)acrylate compound having a molecular weight within a range of 300 to 1,500 and an intramolecular structure $(-CH_2-CH_2-O-)_m$ (where m is an integer between 3 and 14); and a (meth)acrylate compound C, which has a molecular weight within a range of 280 to 1,500 and a C log P value within a range of 4 to 7. The ink contains, in terms of the mass of the entire ink, 1 to 15 mass % of photopolymerizable compound A, 30 to 70 mass % of photopolymerizable compound B, 10 to 40 mass % of photopolymerizable compound C, and 2 to 10 mass % of gelling agent.

15 Claims, 2 Drawing Sheets

(51) Int. Cl.
*C09D 11/101* (2014.01)
*C09D 11/30* (2014.01)
*B41M 7/00* (2006.01)

(56) References Cited

U.S. PATENT DOCUMENTS

2010/0239777 A1* 9/2010 Nakajima ............ C09D 11/322
427/508
2011/0141187 A1* 6/2011 Takabayashi ........ B41M 5/0023
347/20
2013/0307913 A1* 11/2013 Kawashima ............. B41J 2/155
347/100

FOREIGN PATENT DOCUMENTS

| JP | 2009-041015 | A | | 2/2009 | |
|----|----|----|----|----|----|
| JP | 2009-510184 | A | | 3/2009 | |
| JP | 2010-275554 | A | | 12/2010 | |
| JP | 2011-012256 | A | | 1/2011 | |
| JP | 2011208019 | A | * | 10/2011 | ................ B41J 2/01 |
| WO | WO2007025893 | A1 | | 3/2007 | |

* cited by examiner

ACTINIC RADIATION-CURABLE INKJET INK AND IMAGE FORMING METHOD USING SAME

CROSS REFERENCE TO RELATED APPLICATION

This Application is a 371 of PCT/JP2012/008130 filed on Dec. 19, 2012 which, in turn, claimed the priority of Japanese Patent Application No. JP2011-277211 filed on Dec. 19, 2011 both applications are incorporated herein by reference.

TECHNICAL FIELD

The present invention relates to an actinic radiation-curable inkjet ink and an image forming method using the same.

BACKGROUND ART

From the viewpoint of simple and inexpensive image production, inkjet recording has been used in a variety of printing fields such as coating materials for plastics, paper, woodwork, inorganic and materials, adhesives, printing inks, printed circuit boards, and electrical insulation. As the inkjet recording method, there is an UV-curable inkjet method wherein droplets of UV-curable ink are landed on a recording medium and then cured by irradiation with ultraviolet rays to form an image. Recently, the UV-curable inkjet method has been attracting attention for its capability of forming images having high rubfastness and adhesiveness even on recording media which lack ink absorbing properties.

However, the image forming methods using the UV-curable inkjet systems have the drawback of poor image quality due to failure to prevent combining of neighboring dots during high-speed recording such as single pass recoding using a line recording head or high speed serial recording. Moreover, in the case of color image recording, color blending occurs and thus image quality decreases. Furthermore, since the light amount of UV irradiation is small during high-speed printing, the curability or adhesiveness of ink droplets may not be sufficient and thus there is a problem in image fastness such as surface tackiness or reduced rubfastness.

As a technique of preventing "combining of neighboring dots" during inkjet recording regardless of the kind of recording medium, it is known to use an UV-curable ink containing a gelling agent (see PTL 1 and PTL 2).

For example, PTL 1 discloses a radiation-curable hot-melt inkjet ink containing a curable monomer and a gelling agent. PTL 2 discloses a phase change ink containing a white pigment, a curable monomer, a gelling agent, and a photopolymerization initiator, wherein a radical polymerizable compound is disclosed as the curable monomer.

As a technique of preventing reduction in "image fastness" during high-speed printing, it is known to use an UV-curable ink containing a radical polymerizable compound having a hydroxyl group (see PTL 3 and PTL 4).

For example, PTL 3 discloses an active energy ray-curable ink for inkjet, which contains 2-hydroxy-3-phenoxypropyl acrylate having a hydroxyl group. PTL 4 discloses a technique of applying a radical polymerizable compound having a hydroxyl group as an undercoating liquid in advance.

CITATION LIST

Patent Literature

PTL 1
Japanese Translation of PCT Application Laid-Open No. 2009-510184
PTL 2
Japanese Patent Application Laid-Open No. 2009-041015
PTL 3
Japanese Patent Application Laid-Open No. 2007-56232
PTL 4
Japanese Patent Application Laid-Open No. 2008-213450

SUMMARY OF INVENTION

Technical Problem

However, in the case of the ink compositions disclosed in PTL 1 and PTL 2, prevention of dot combining during high-speed printing is still insufficient. Moreover, the ink compositions cause a reduction in image fastness during high-speed printing and thus raise a practical problem.

In the case of the ink compositions disclosed in PTL 3 and PTL 4, ink droplet curability during high-speed printing is also still insufficient and causes image quality reduction due to lack of any measure for preventing ink droplets from combining Therefore, no ink compositions have been known in the art that can achieve the formation of high-resolution images and improvement of ink droplet curability during high-speed printing.

The present invention was made in view of the circumstances described above, and the present invention confers gelation stability to the gelling agent and high curability to ink droplets. It is an object of the present invention to provide, with gelation stability and high ink droplet curability, an actinic radiation-curable inkjet ink which can stably form a high-resolution image even in high-speed printing and has satisfactory image fastness, and an image forming method using the same.

Solution to Problem

The inventors added a "photopolymerizable compound having a hydroxyl group" and a "photopolymerizable compound having a specific C log P value" in the actinic radiation-curable inkjet ink in an aim to achieve dissolution stability of gelling agent, gelation stability and ink droplet curability. They found that this allows the gelling agent in the ink to undergo gelation stably with good reproducibility and that high-resolution image formation and satisfactory image fastness can be attained even by high-speed printing by effectively curing the ink droplets landed on the recording medium.

The reason for stable gelation is not limited; stable gelation is attained because a balance is struck between dissolution and crystallization of gelling agent by adding both of the above components. More specifically, "photopolymerizable compound C" allows the gelling agent to be suitably dissolved in the ink under heating condition and "photopolymerizable compound A" allows the gelling agent in the ink landed on the recording medium to be suitably crystallized. The present invention was made based on the findings described above.

That is, a first aspect of the present invention relates to an actinic radiation-curable inkjet ink and an image forming method using the same given below.

[1] An actinic radiation-curable inkjet ink that undergoes temperature-induced reversible sol-gel phase transition, the actinic radiation-curable inkjet ink including a colorant, a gelling agent, a photopolymerizable compound, and a photopolymerization initiator, in which the photopolymerizable compound includes a photopolymerizable compound A, which is a (meth)acrylate compound having a hydroxyl group; a photopolymerizable compound B, which is a (meth)acrylate compound having a molecular weight in a range from 300 to 1,500 and having a structure represented by ($-CH_2-CH_2-O-$)$_m$ (where m is an integer of from 3 to 14) in the molecule; and a photopolymerizable compound C, which is a (meth)acrylate compound having a molecular weight in a range from 280 to 1,500 and having a C log P value in a range from 4.0 to 7.0, the photopolymerizable compound A is contained in an amount in a range from 1 to 15 wt % relative to a total weight of the ink, the photopolymerizable compound B is contained in an amount in a range from 30 to 70 wt % relative to the total weight of the ink, the photopolymerizable compound C is contained in an amount in a range from 10 to 40 wt % relative to the total weight of the ink, and the gelling agent is contained in an amount in a range from 2 to 10 wt % relative to the total weight of the ink.

[2] The actinic radiation-curable inkjet ink according to [1], in which the number of polymerizable functional groups of the photopolymerizable compound A is two or more.

[3] The actinic radiation-curable inkjet ink according to [1], in which the photopolymerizable compound C is at least one (meth)acrylate compound selected from the following compounds (1) and (2):

(1) a trifunctional or higher-functional (meth)acrylate compound having a structure represented by ($-C(CH_3)H-CH_2-O-$)$_m$ (where m is an integer of from 3 to 14) in the molecule, and (2) a bifunctional or higher-functional (meth)acrylate compound having a cyclic structure in the molecule.

[4] The actinic radiation-curable inkjet ink according to [1], in which the gelling agent is at least one compound selected from compounds represented by the following Formulas (G1) and (G2):

R1-CO—R2, and      Formula (G1):

R3-COO—R4      Formula (G2):

(where R1 to R4 each independently represent an alkyl chain which has a straight-chain moiety with 12 or more carbon atoms and also may have a branch).

[5] An image forming method using the actinic radiation-curable inkjet ink according to [1], the method including attaching ink droplets of the actinic radiation-curable inkjet ink to a recording medium by discharging the ink droplets from an inkjet recording head, and curing the ink droplets landed on the recoding medium by irradiating the ink droplets with actinic radiation, in which a temperature of the recording medium when the actinic radiation-curable inkjet ink is landed on the recording medium is set to be in a range from 20° C. to 60° C.

Advantageous Effects of Invention

According to the present invention, it is possible to provide an actinic radiation-curable inkjet ink which confers gelation stability to the gelling agent and high curability to ink droplets, and an image forming method using the same. Moreover, it is possible to stably form a high-resolution image even by high-speed printing and to provide satisfactory image fastness.

DESCRIPTION OF EMBODIMENTS

Figure 1A:
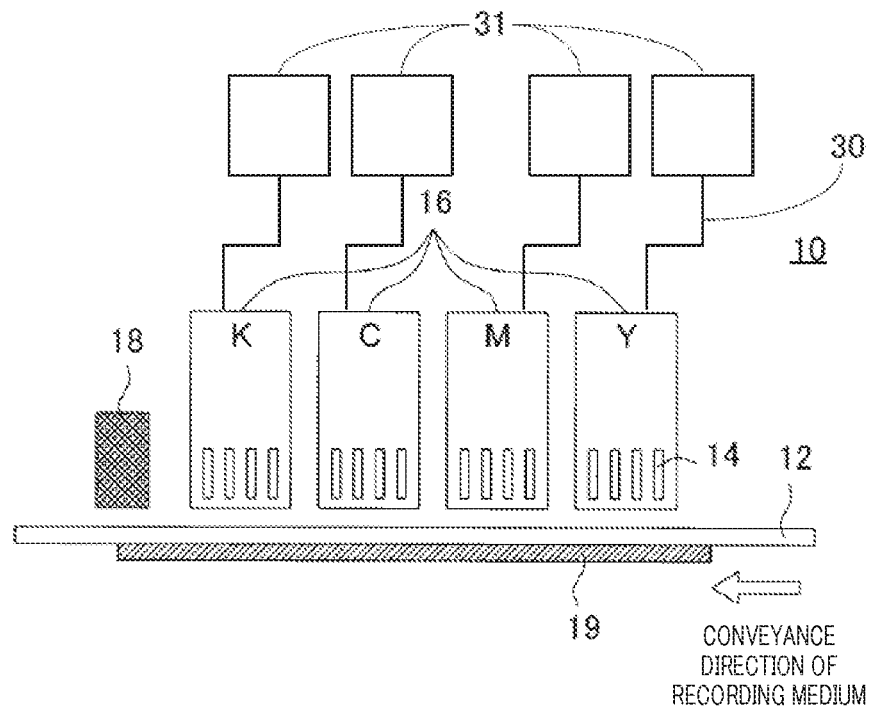
FIGS. 1A and 1B illustrate examples of the configuration of main parts of inkjet recording apparatus of line recording type.

Hereinafter, the present invention is described with reference to embodiments, but the present invention is not limited to the following embodiments.

(1. Actinic Radiation-Curable Inkjet Ink)

The actinic radiation-curable inkjet ink according to an embodiment contains at least a colorant, a gelling agent, a photopolymerizable compound, and a photopolymerization initiator.

(Photopolymerizable Compound)

The photopolymerizable compound is a compound which is crosslinked or polymerized by irradiation with light. Examples of actinic radiation include electron beams, ultraviolet rays, α rays, γ rays, and X rays. Ultraviolet rays are preferable. The photopolymerizable compound is a radical polymerizable compound or a cationic polymerizable compound, and is preferably a radical polymerizable compound.

The radical polymerizable compound is a compound (monomer, oligomer, polymer or mixture of these) which has an ethylenically unsaturated bond, which is radically polymerizable. The radical polymerizable compound may be used either singly or in combination of two or more types.

Examples of the compound having an ethylenically unsaturated bond, which is radically polymerizable, include an unsaturated carboxylic acid and a salt thereof, an unsaturated carboxylic ester compound, an unsaturated carboxylic urethane compound, an unsaturated carboxylic amide compound and an anhydride thereof, acrylonitrile, styrene, unsaturated polyester, unsaturated polyether, unsaturated polyamide, and unsaturated urethane. Examples of the unsaturated carboxylic acid include (meth)acrylic acid, itaconic acid, crotonic acid, isocrotonic acid, and maleic acid.

Among the foregoing, the radical polymerizable compound is preferably an unsaturated carboxylic ester compound and more preferably a (meth)acrylate compound. In addition to a monomer, the (meth)acrylate compound may be an oligomer, a mixture of a monomer and an oligomer, a modified product, or an oligomer having a polymerizable functional group. The term "(meth)acrylate" indicates both or one of "acrylate" and "methacrylate" and the term "(meth) acryl" indicates both or one of "acryl" and "methacryl".

The actinic radiation-curable inkjet ink includes a (meth) acrylate compound having a hydroxyl group as a photopolymerizable compound A, a (meth)acrylate compound having a molecular weight in a range from 300 to 1,500 and having a structure represented by ($-CH_2-CH_2-O-$)$_m$ (where m is an integer of from 3 to 14) in the molecule as a photopolymerizable compound B, and a (meth)acrylate compound having a molecular weight in a range from 280 to 1,500 and having a C log P value in a range from 4.0 to 7.0 as a photopolymerizable compound C.

(Photopolymerizable Compound A)

The photopolymerizable compound A is a (meth)acrylate compound having a hydroxyl group. The actinic radiation-curable inkjet ink contains at least one photopolymerizable compound A, which is a (meth)acrylate compound having a hydroxyl group, as an essential component. Such a photopolymerizable compound A is a compound, which itself is cured in such a manner that the polymerization reaction is begun by the function of a polymerization initiator or the like, which is described later, at the time of irradiation with actinic radiation. By the polymerization reaction, adhesion between the ink-cured product and the recorded medium can be increased.

The photopolymerizable compound A is a compound having at least one radically polymerizable functional group in one molecule together with at least one hydroxyl group (—OH) binding to a carbon atom, and the hydroxyl group is preferably an alcoholic hydroxyl group or a phenolic hydroxyl group. The number of the hydroxyl groups contained in the polymerizable compound A is preferably two or less and more preferably one.

Moreover, the number of polymerizable functional groups of the photopolymerizable compound A is preferably two or more, more preferably three or more, and particularly preferably four or less. When the photopolymerizable compound A has two or more polymerizable functional groups, degree of cross-linkage of the ink-cured product increases and the image fastness is enhanced. Such a photopolymerizable compound A may be used either singly or in combination of two or more types.

Further, the photopolymerizable compound A is preferably a compound which does not cause an increase in the viscosity of the actinic radiation-curable inkjet ink when adding the compound to the ink. For this reason, the photopolymerizable compound A is preferably a monomer rather than a polymer or an oligomer.

Furthermore, the photopolymerizable compound A is preferably has compatibility with other photopolymerizable compounds (photopolymerizable compound B and photopolymerizable compound C which are described later).

The viscosity of the photopolymerizable compound A at 25° C. is preferably from 5 to 100,000 mPa·s. When the viscosity is 5 mPa·s or more, ejection stability of the actinic radiation-curable inkjet ink according to an embodiment is not impaired. In addition, when the viscosity is 100,000 mPa·s or less, it is possible to limit an increase in the viscosity of the actinic radiation-curable inkjet ink according to an embodiment. The viscosity is more preferably from 10 to 10,000 mPa·s and still more preferably from 200 to 1,000 mPa·s.

The molecular weight of the photopolymerizable compound A is preferably from 74 to 2,000. When the molecular weight is 2,000 or less, it is possible to limit an increase in the viscosity of the actinic radiation-curable inkjet ink according to an embodiment. The molecular weight is more preferably 1,000 or less, still more preferably 800 or less, and particularly preferably from 150 to 500.

The content of the photopolymerizable compound A in the actinic radiation-curable inkjet ink according to an embodiment is preferably from 1 to 15 wt % relative to the total weight of the ink. When the content of the photopolymerizable compound A is less than 1 wt %, the gelation speed of the ink is decreased, so that the shape of dots may be impaired, or defects or blurring may occur. On the other hand, when the content of the photopolymerizable compound A exceeds 15 wt %, the compatibility between the photopolymerizable compound A and other components including a gelling agent is lowered and thus the gel structure may be unstable.

Specific examples of the photopolymerizable compound A include the following compounds but are not limited thereto.

Examples of monofunctional (meth)acrylates containing a hydroxyl group include 2-hydroxyethyl(meth)acrylate, 3-hydroxypropyl(meth)acrylate, 1-methyl-2-hydroxyethyl(meth)acrylate, 2-hydroxypropyl(meth)acrylate, 4-hydroxybutyl(meth)acrylate, 4-hydroxycyclohexyl(meth)acrylate, 5-hydroxypentyl(meth)acrylate, 6-hydroxyhexyl(meth)acrylate, 4-hydroxymethylcyclohexylmethyl(meth)acrylate, p-hydroxymethyl phenylmethyl(meth)acrylate, 2-(hydroxyethoxy)ethyl(meth)acrylate, 2-(hydroxyethoxyethoxy)ethyl(meth)acrylate, 2-(hydroxyethoxyethoxyethoxy)ethyl(meth)acrylate, methyl α-hydroxymethyl acrylate, ethyl α-hydroxymethyl acrylate, hydroxyalkyl(meth)acrylate, 2-hydroxybutyl(meth)acrylate, 2-methacryloyloxy ethyl-2-hydroxypropyl phthalate, 2-hydroxy-3-phenoxypropyl (meth)acrylate, and 2-hydroxy-3-phenoxypropyl acrylate.

Examples of polyfunctional (meth)acrylates having a hydroxyl group include 2-hydroxy-3-acryloyloxypropyl methacrylate, dipentaerythritol penta(meth)acrylate, ethylene oxide-adducted pentaerythritol tetra(meth)acrylate, trimethylolpropane diacrylate, glycerin di(meth)acrylate, glycerin acrylate methacrylate, pentaerythritol di(meth)acrylate, hydroxy pivalic acid neopentyl glycol di(meth)acrylate, dipentaerythritol tri(meth)acrylate, propionic acid dipentaerythritol tri(meth)acrylate, hydroxypivalylaldehyde-modified dimethylolpropane tri(meth)acrylate, sorbitol tri(meth)acrylate, sorbitol tetra(meth)acrylate, sorbitol penta(meth)acrylate, sorbitol hexa(meth)acrylate, and pentaerythritol tri(meth)acrylate.

Moreover, the photopolymerizable compound A is preferably a compound represented by the following Formula (1):

$(Z)_n$—R4-OH    (1)

(where Z represents $CH_2$=CR1-COO—, n represents an integer of from 1 to 3, R1 represents a hydrogen atom or a methyl group, and R4 represents an organic residue having from 2 to 20 carbon atoms.)

In the above Formula (1), an organic residue represented by R4 is preferably a straight-chain, branched or cyclic alkylene group having from 2 to 20 carbon atoms, an alkylene group having an oxygen atom in the structure by ether bonding and/or ester bonding and having from 2 to 20 carbon atoms, and an aromatic group which has from 6 to 11 carbon atoms and may be substituted. Among them, a straight-chain, branched or cyclic alkylene group having from 2 to 6 carbon atoms, and an alkylene group having an oxygen atom in the structure by ether bonding and having from 2 to 9 carbon atoms are preferable.

Specific examples of the photopolymerizable compound A represented by the above Formula (1) include 2-hydroxyethyl (meth)acrylate, 3-hydroxypropyl(meth)acrylate, 1-methyl-2-hydroxyethyl(meth)acrylate, 2-hydroxypropyl(meth)acrylate, 4-hydroxybutyl(meth)acrylate, 4-hydroxycyclohexyl(meth)acrylate, 5-hydroxypentyl(meth)acrylate, 6-hydroxyhexyl(meth)acrylate, 4-hydroxymethyl cyclohexyl methyl(meth)acrylate, p-hydroxymethyl phenylmethyl(meth)acrylate, 2-(hydroxyethoxy)ethyl(meth)acrylate, 2-(hydroxyethoxyethoxy)ethyl(meth)acrylate, 2-(hydroxyethoxyethoxyethoxy)ethyl(meth)acrylate, and 2-hydroxy-3-phenoxypropyl acrylate.

Specific examples of the photopolymerizable compound A, which is more preferable from the viewpoint of curing speed, include 2-hydroxypropyl acrylate, 2-hydroxypropyl methacrylate, 2-hydroxy butyl acrylate, 2-hydroxy-3-acryloyloxy propyl methacrylate, 2-hydroxy-3-phenoxy propyl acrylate, pentaerythritol triacrylate, alicyclic carboxylic acid-based epoxy acrylate, such as a modified acrylic product of hexahydrodiphthalic acid glycidyl diester, and dipentaerythritol pentaacrylate. Among them, pentaerythritol triacrylate is preferable.

In the actinic radiation-curable inkjet ink, the photopolymerizable compounds A having a hydroxyl group generate intermolecular hydrogen bonding between the compounds by hydroxyl groups. Due to the intermolecular hydrogen bonding, the photopolymerizable compound A is pseudo-polymerized. The pseudo-polymerized photopolymerizable compound A may act as a compound having more polymerizable functional groups. For example, when a photopolymerizable compound A having two polymerizable functional groups is pseudo-dimerized by hydrogen bonding, the photopolymerizable compound A may act as a compound having four polymerizable functional groups. In a case of an actinic radiation-curable inkjet ink containing a polymerizable compound having more polymerizable functional groups, curability of the actinic radiation-curable inkjet ink is likely to increase. Therefore, curability of the actinic radiation-curable inkjet ink according to an embodiment increases.

On the other hand, in a case of an inkjet ink containing a photopolymerizable compound having too many polymerizable functional groups, the viscosity of the ink is likely to increase. Therefore, ejection stability of the inkjet ink may be reduced, or an ink-cured product may be contracted so that an image is likely to be curled. In contrast, by appropriately controlling the number of polymerizable functional groups of the photopolymerizable compound A contained in the actinic radiation-curable inkjet ink according to an embodiment, it is possible to limit an increase in the viscosity of the ink and thus curling of the image is less likely to occur. In addition, the actinic radiation-curable inkjet ink according to an embodiment may be ejected at a high temperature. In a case where the ink is ejected at a high temperature, the molecular motion of the photopolymerizable compound A increases and thus the influence of the hydrogen bonding is lessened. Therefore, it is possible to more effectively prevent an increase in the viscosity of the ink.

(Photopolymerizable Compound B)

The photopolymerizable compound B is a (meth)acrylate compound having a structure represented by $(-CH_2-CH_2-O-)_m$ (where m is an integer of from 3 to 14) in the molecule.

The molecular weight of the photopolymerizable compound B is preferably in a range from 300 to 1,500, and more preferably in a range from 300 to 800. When selecting a photopolymerizable compound having a molecular weight of 300 or more, the inkjet ink less volatizes in the nozzles and ejection stability is not impaired.

Furthermore, an ink composition containing a photopolymerizable compound with a molecular weight of more than 1,500 and a gelling agent is not suitable as a composition of the actinic radiation-curable inkjet ink since the ink composition has excessively high sol viscosity.

The photopolymerizable compound B is (meth)acrylic acid ester and has a repeating unit of ethylene glycol in the ester moiety. Moreover, the photopolymerizable compound B preferably has two or more (meth)acrylic groups. Specifically, the photopolymerizable compound B preferably has two, three, or four (meth)acrylic groups.

Specific examples of the photopolymerizable compound B include 4EO modified hexanediol diacrylate (CD561, molecular weight: 358, manufactured by Sartomer Company, Inc.), 3EO modified trimethylolpropane triacrylate (SR454, molecular weight: 429, manufactured by Sartomer Company, Inc.), 4EO modified pentaerythritol tetraacrylate (SR494, molecular weight: 528, manufactured by Sartomer Company, Inc.), 6EO modified trimethylolpropane triacrylate (SR499, molecular weight: 560, manufactured by Sartomer Company, Inc.), polyethylene glycol diacrylate (NK ESTER A-400, molecular weight: 508, manufactured by Shin-Nakamura Chemical Co., Ltd.), (NK ESTER A-600, molecular weight: 708, manufactured by Shin-Nakamura Chemical Co., Ltd.), polyethylene glycol dimethacrylate (NK ESTER 9G, molecular weight: 536, manufactured by Shin-Nakamura Chemical Co., Ltd.), (NK ESTER 14G, molecular weight: 736, manufactured by Shin-Nakamura Chemical Co., Ltd.), and tetraethylene glycol diacrylate (V#335HP, molecular weight: 302, manufactured by OSAKA ORGANIC CHEMICAL INDUSTRY LTD.).

The added amount of the photopolymerizable compound B in the actinic radiation-curable inkjet ink according to an embodiment is preferably from 30 to 70 wt % relative to the total weight of the ink.

(Photopolymerizable Compound C)

The photopolymerizable compound C is a compound having a (meth)acrylate group and it more preferably has two or more (meth)acrylate groups.

The molecular weight of the photopolymerizable compound C is preferably in a range from 280 to 1,500, and more preferably in a range from 300 to 800. The reason why the molecular weight of the photopolymerizable compound C is preferably set to be within the above-described range is the same reason as described in the above Section for for photopolymerizable compound B.

The C log P value of the photopolymerizable compound C is preferably in a range from 4.0 to 7.0, and more preferably in a range from 4.5 to 6.0.

When the C log P value of the photopolymerizable compound C is lower than 4.0, the actinic radiation-curable inkjet ink becomes hydrophilic, and thus it is difficult for the gelling agent to be dissolved, and also there is a case in which the gelling agent is not fully dissolved even by heating, and thus the gelling agent is not stabilized. Further, when the C log P value of the photopolymerizable compound C is more than 7.0, the solubility of the photopolymerization initiator and initiation promoter in the ink is lowered so that the curability and/or ability of ink discharge from the inkjet recording head are lowered.

As used herein, the term "Log P value" is a coefficient indicating the affinity of an organic compound to water and 1-octanol. The 1-octanol/water partition coefficient P is a partition equilibrium achieved when a trace amount of a compound is dissolved as a solute in a two-liquid phase solvent of 1-octanol and water, and the partition coefficient P is the ratio of equilibrium concentrations of the compound in the respective solvents, and is expressed as Log P, the logarithm to the base 10 of the partition coefficient. That is, the "log value" is a logarithmic value of the partition coefficient of 1-octanol/water, and is known as an important parameter indicating the hydrophilicity and hydrophobicity of a molecule.

"C log P" is a Log P value found by calculation. The C log P value can be calculated by the fragment method, atomic approach method or the like. More specifically, in order to calculate the C log P value, the fragment method described in literatures (C. Hansch and A. Leo, "Substituent Constants for Correlation Analysis in Chemistry and Biology" (John Wiley & Sons, New York, 1969)), or commercially available software package 1 or 2 described below may be used.

Software package 1: MedChem Software (Release 3.54, August 1991, Medicinal Chemistry Project, Pomona College, Claremont, Calif.)

Software package 2: ChemDraw Ultra Ver. 8.0. (April 2003, CambridgeSoft Corporation, USA)

The numerical value of the C log P value as used herein is a "C log P value" calculated using software package 2.

More preferred examples of the photopolymerizable compound C include (1) a methacrylate or acrylate compound with a functionality of 3 or more, which has a structure represented by $(-C(CH_3)H-CH_2-O-)_m$ (where m is an integer of from 3 to 14) in the molecule, and (2) a methacrylate or acrylate compound with a functionality of 2 or more, which has a cyclic structure in the molecule. Those photopolymerizable compounds have high photocurability, prevented shrinkage at curing, and further improved reproducibility of sol-gel phase transition.

Examples of (1) the methacrylate or acrylate compound with a functionality of 3 or more, which has a structure represented by $(-C(CH_3)H-CH_2-O-)_m$ (where m is an integer of from 3 to 14) in the molecule include a compound obtained by modifying a hydroxyl group of a compound having three or more hydroxyl groups with propylene oxide and esterifying the obtained modified product with (meth) acrylic acid. Specific examples of the compound include, although not limited thereto, 3PO modified trimethylolpropane triacrylate Photomer 4072 (molecular weight 471, C log P 4.90, manufactured by Cognis) and 3PO modified trimethylolpropane triacrylate Miramer M360 (molecular weight 471, C log P 4.90, manufactured by Miwon).

Examples of (2) the bifunctional or higher-functional methacrylate or acrylate compound having a cyclic structure in the molecule include a compound obtained by esterifying a hydroxyl group of a compound having two or more hydroxyl groups and tricycloalkane with (meth)acrylic acid. Specific examples of the compound include, but not limited to, the following compounds:

Tricyclodecane dimethanol diacrylate (NK ESTER A-DCP, molecular weight: 304, C log P: 4.69, manufactured by Shin-Nakamura Chemical Co., Ltd.), and Tricyclodecane dimethanol dimethacrylate (NK ESTER DCP, molecular weight: 332, C log P: 5.12, manufactured by Shin-Nakamura Chemical Co., Ltd.).

Another specific example of the photopolymerizable compound C is 1,10-decanediol dimethacrylate (NK ESTER DOD-N, molecular weight: 310, C log P: 5.75, manufactured by Shin-Nakamura Chemical Co., Ltd.).

The added amount of the photopolymerizable compound C in the actinic radiation-curable inkjet ink according to an embodiment is preferably from 10 to 40 wt % relative to the total weight of the ink. When the amount is less than 10 wt %, the ink becomes hydrophilic and the solubility of the gelling agent is lowered, and thus the stability of gelation is impaired. Further, when the amount is more than 40 wt %, high shrinkage is yielded when the ink droplets are cured, and the printed matter is curled. Accordingly, there may be a case in which the image film is torn when the image is bent.

The actinic radiation-curable inkjet ink according to an embodiment may further contain other photopolymerizable compounds. Examples of other photopolymerizable compounds may include a (meth)acrylate monomer and/or oligomer.

For the conventional actinic radiation-curable inkjet inks that undergo sol-gel phase transition, compatibility between the gelling agent and the photopolymerizable compound has not been investigated in detail, and although dot combining can be prevented in the initial period of printing, when printing is continued, prevention of dot combining becomes unstable in some cases. In addition, since a cured product of the photopolymerizable compound is contracted considerably, the printed matter is curled. Accordingly, the image film is undesirably torn when the image is bent.

The inventors found that, by adding certain amounts of photopolymerizable compound A and photopolymerizable compound C in the actinic radiation-curable inkjet ink, it is possible to satisfy properties such as satisfactory ink droplet curability, high image quality (prevention of dot combining and absence of printed letter collapse), and reproducibility (dissolution stability of gelling agent=discharge stability) in regard to an actinic radiation-curable inkjet ink of sol-gel phase transition type.

The reason why a high-resolution image can be obtained by using the actinic radiation-curable inkjet ink according to an embodiment is not limited; a possible reason is as follows. Specifically, by adding the photopolymerizable compound C in the actinic radiation-curable inkjet ink, the solubility of the gelling agent is increased and discharge stability of ink droplets is improved. In addition, by adding the photopolymerizable compound A in the actinic radiation-curable inkjet ink, the gelling agent is precipitated or crystallized stably and quickly. Therefore, combining of ink droplets is prevented effectively.

Moreover, in the actinic radiation-curable inkjet ink according to an embodiment, the photopolymerizable compound A having relatively high hydrophilicity and the photopolymerizable compound C having relatively high hydrophobicity are mixed in a relatively homogenous manner. Therefore, a gelling agent having a hydrophobic part and a hydrophilic part can exist uniformly in these photopolymerizable compounds.

Accordingly, ink droplets of the actinic radiation-curable inkjet ink according to an embodiment form a strong gel structure immediately after they are landed on the recording medium, whereby a high-resolution image can be obtained even by high-speed printing.

(Gelling Agent)

The gelling agent contained in the actinic radiation-curable inkjet ink has a function of causing the ink to undergo temperature-induced reversible sol-gel phase transition. Such a gelling agent is required to satisfy at least the followings requirements: 1) the gelling agent is dissolved in a photocurable compound at a temperature higher than the gelation temperature and 2) the gelling agent is crystallized in the ink at a temperature lower than the gelation temperature.

Regarding the above requirement 1), "sol-gel phase transition temperature" means a temperature of change (transition) point at which a change (transition) from sol state to gel state occurs, and it has the same meaning as the terms like gel transition temperature, gel dissolution temperature, gel softening temperature, sol-gel transition point, and gelling point.

Regarding the above requirement 2), when the gelling agent is crystallized in an ink, it is preferable that a space three-dimensionally surrounded by plate-like crystals, a crystallization product of the gelling agent, is formed so that the photocurable compound is included in that space. A structure in which a photocurable compound is included in a space three-dimensionally surrounded by plate-like crystals can be referred to as a "card house structure." Once a card house structure is formed, the liquid photocurable compound can be maintained and ink droplets can be pinned. Accordingly, combining of liquid droplets can be prevented. It is preferable that the photocurable compound and the gelling agent dissolving in the ink are compatible each other to form the card house structure.

The sol-gel transition temperature of the actinic radiation-curable inkjet ink is arbitrarily set, but from the viewpoint of stabilized discharge properties of the ink droplets, adverse effects that accompany heating at a high temperature and the like, it is preferably in a range from 30 to 100° C. Further, the sol-gel transition temperature is preferably between the ink temperature inside the inkjet recording head and the temperature of the recording medium.

Regarding the method for measuring the sol-gel transition temperature, for example, a gel-like specimen is placed on a heating plate, the heating plate is heated, and the temperature at which the shape of the specimen is destroyed is measured. This temperature can be determined as the sol-gel phase transition temperature. Furthermore, it can be also measured using a commercially available viscoelasticity meter (e.g., viscoelasticity meter MCR300 manufactured by Physica Messtechnik GmbH).

The sol-gel transition temperature can be adjusted according to the type, amount of addition and the like of the gelling agent, photopolymerizable compound, and the like that will be described below.

The "gel" state as used herein means solidified or semi-solidified state of material accompanied by a rapid viscosity increase or remarkable elasticity increase, wherein the material has structure in which solutes gathered as a result of losing their independent mobility due to lamella structure, a polymer network with covalent bonds and/or hydrogen bonds, and a polymer network formed by physical coagulation.

As the requirement generally needed for a gelling agent, that is, the structure required from a gelling agent, it is to have a hydrophobic part (for example, an alkyl chain having 12 or more carbon atoms) and a hydrophilic part (for example, a polar group) together. Accordingly, when the temperature of the ink is lowered, and the molecular motion of the photopolymerizable compounds that serve as solvents is decreased, the hydrophobic parts gather together surrounding the solvent under the action of intermolecular force, and the hydrophilic parts gather under the action of hydrogen bonding. Thereby, a gel is formed. Therefore, it is important to secure compatibility between the photopolymerizable compound and the gelling agent in the ink in order to stably discharge ink droplets or to stably prevent combining of dots regardless of printing speed.

Examples of the gelling agent include dialkyl ketones, fatty acid esters, fatty acid alcohols, and oil gelling agents.

O—N: hardened beef tallow acid amide (all available from Kao Corporation), NIKKA AMIDE API: stearic acid amide (available from Nippon Kasei Chemical Co., Ltd.), and GP-1: N-lauroyl-L-glutamic acid dibutylamide (available from Ajinomoto Fine-Techno Co., Inc.).

However, a fatty acid amide or urethane compound, and a gelling agent having a polar group such as —OH or —COOH at the end of an alkyl chain having 12 or more carbon atoms may have poor stability in the ink in a heated state and thus precipitation or layer separation may occur. Moreover, elution of the gelling agent from the image film after UV-induced curing occurs slowly over time, causing a problem depending on the storage conditions for images.

In view of such a circumstance, examples of the gelling agent, which is particularly preferable, include compounds represented by the following Formulas (G1) and (G2):

$$R1\text{-}CO\text{—}R2 \quad \text{Formula (G1):}$$

$$R3\text{-}COO\text{—}R4 \quad \text{Formula (G2):}$$

In the formula, R1 to R4 each independently represent an alkyl chain having a straight-chain moiety having 12 or more carbon atoms, which may also have a branch.

The compound represented by Formula (G1) is called a ketone wax and the compound represented by Formula (G2) is called a fatty acid ester. These gelling agents allow the ink droplets to undergo gelation more stably (with satisfactory reproducibility) and thus combining of ink droplets (dots) landed on the recording medium can be advantageously prevented.

Specific examples of the gelling agents as a ketone wax and a fatty acid ester include gelling agents described in the following Table 1 but are not limited thereto.

TABLE 1

| Classification | Structure | Name | Manufacturer |
|---|---|---|---|
| Ketone wax | Distearyl ketone | Kao wax T1 | Kao Corporation |
| | | 18-Pentatriacontanone | Reagent (Arfa Aeser) |
| | Dipalmityl ketone | Hentriacontan-16-on | Reagent (Arfa Aeser) |
| | Dilauryl ketone | 12-tricosanone | Reagent (Arfa Aeser) |
| Fatty acid ester | Stearyl stearate | EXCEPARL SS | Kao Corporation |
| | | UNISTAR M-9676 | NOF Corporation |
| | | EMALEX CC-18 | NIHON EMULSION Co., Ltd. |
| | | AMREPS SS | KOKYU ALCOHOL KOGYO CO., LTD. |
| | Cetyl palmitate | AMREPS PC | KOKYU ALCOHOL KOGYO CO., LTD. |
| | Behenyl behenate | UNISTAR M-2222SL | NOF Corporation |

Specific examples of the gelling agent include low molecular weight compounds having molecular weights of less than 1,000, such as fatty acid alcohols such as stearone (18-pentatriacontanone), 16-hentriacontanone, 12-tricosanone, and UNILIN425; fatty acid esters; inulin stearate-fatty acid dextrin (available from Chiba Flour Milling Co., Ltd. as RHEOPEARL series); L-glutamic acid derivatives (available from Ajinomoto Fine-Techno Co., Inc.); fatty acid amides (FATTY AMID series, available from Kao Corp.); glyceryl behenate/eicosanedioate (NOMCORT HK-G, Nisshin Oillio Group, Ltd.); jojoba ester (FLORAESTER 70, available from Ikeda Corp.); and the oil gelling agents described in Japanese Patent Application Laid-Open No. 2005-126507 or 2005-255821. However, it is not intended to be limited to these.

Furthermore, specific examples of the gelling agent that is the fatty acid amide, include FATTY AMID E: erucic acid amide, FATTY AMID T: oleic acid amide, FATTY AMID Because the actinic radiation-curable inkjet ink according to an embodiment contains a predetermined amount of a gelling agent, when it is discharged from an inkjet recording head, landed as ink droplets on a recording medium, and cooled to a temperature lower than the sol-gel phase transition temperature, the ink quickly turns into a gel state. Accordingly, mixing or combining of dots is prevented, and a high quality image can be formed in high-speed printing. Thereafter, the inkjet ink is fixed onto the recording medium as the gelled ink droplets are cured by irradiation with light, and a firm image film is formed.

Because the actinic radiation-curable inkjet ink according to an embodiment does not allow spread of ink droplets on a recording medium as the ink droplets landed on a recording medium quickly undergo gelation, it is less likely that oxygen in the environment enters the ink droplets. Thus, curing is less likely to be influenced by oxygen inhibition.

The content of the gelling agent in the actinic radiation-curable inkjet ink is preferably from 0.5 to 10 wt % and more preferably from 2 to 10 wt %. The reason why the above range is preferable is as follows. When the content is less than 0.5 wt %, ink droplets cannot undergo gelation (temperature-induced sol-gel phase transition). On the other hand, when the content exceeds 10 wt %, the gelling agent cannot be dissolved sufficiently in the ink and thus ink ejection property is lowered.

(Photopolymerization Initiator)

The actinic radiation-curable inkjet ink may further contain a photopolymerization initiator, if necessary.

The photopolymerization initiator includes an intramolecular bond cleaving type and an intramolecular hydrogen withdrawing type. Examples of the intramolecular bond cleaving type photopolymerization initiator include acetophenones such as diethoxy acetophenone, 2-hydroxy-2-methyl-1-phenyl propan-1-one, benzyl dimethyl ketal, 1-(4-isopropyl phenyl)-2-hydroxy-2-methyl propan-1-one, 4-(2-hydroxy ethoxy) phenyl-(2-hydroxy-2-propyl) ketone, 1-hydroxy cyclohexyl phenyl ketone, 2-methyl-2-morpholino-(4-thio methylphenyl) propan-1-one, and 2-benzyl-2-dimethylamino-1-(4-morpholino phenyl)-butanone; benzoins such as benzoin, benzoin methyl ether and benzoin isopropyl ether; acyl phosphine oxides such as 2,4,6-trimethyl benzoin diphenyl phosphine oxide; benzyl, and methylphenyl glyoxy ester.

Examples of the intramolecular hydrogen withdrawing type photopolymerization include benzophenones such as benzophenone, o-benzoyl benzoic acid methyl-4-phenyl benzophenone, 4,4'-dichloro benzophenone, hydroxy benzophenone, 4-benzoyl-4'-methyldiphenyl sulfide, acrylated benzophenone, 3,3',4,4'-tetra-(t-butyl peroxy carbonyl) benzophenone; and 3,3'-dimethyl-4-methoxy benzophenone; thioxanthones such as 2-isopropyl thioxanthone, 2,4-dimethyl thioxanthone, 2,4-diethyl thioxanethon, and 2,4-dichloro thioxanethon; aminobenzophenones such as Michler's ketone and 4,4'-diethylaminobenzophenone; 10-butyl-2-chloro acridone, 2-ethyl anthraquinone, 9,10-phenanthrene quinone, and camphor quinone.

Among the foregoing, acylphosphine oxide or acyl phosphonate can be preferably used from the viewpoint of sensitivity.

Specific examples of the preferred include bis(2,4,6-trimethylbenzoyl)-phenylphosphine oxide and bis(2,6-dimethoxybenzoyl)-2,4,4-trimethyl-pentylphosphine oxide.

Preferred addition amount of the photopolymerization initiator is from 0.1 to 10 wt %, and particularly preferably from 2 to 8 wt % of the total ink composition.

As a photopolymerization initiator, the actinic radiation-curable inkjet ink may further contain a photoacid generating agent. As such photoacid generating agent, a compound used for chemical amplification type photoresists or photo-cationic polymerization is used (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

If necessary, the actinic radiation-curable inkjet ink may further contain a photopolymerization initiator auxiliary agent, a polymerization inhibitor, or the like. The photopolymerization initiator auxiliary agent may be a tertiary amine compound and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxy ethylaniline, triethylamine, and N,N-dimethyl hexylamine Among them, N,N-dimethylamino-p-benzoic acid ethyl ester and N,N-dimethylamino-p-benzoic acid isoamyl ethyl ester are preferable. These compounds may be used either singly or in combination of two or more types.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazine, phenothiazine, p-benzoquinone, nitrosobenzene, 2,5-di-tert-butyl-p-benzoquinone, dithiobenzoyl disulfide, picric acid, cupferrone, aluminum N-nitrosophenyl hydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

(Colorant)

The actinic radiation-curable inkjet ink preferably contains at least one of various dyes and pigments known in the art, and particularly preferably contains a pigment.

Examples of the pigment which may be contained in the actinic radiation-curable inkjet ink are listed below.

C. I. Pigment Yellow 1, 2, 3, 12, 13, 14, 16, 17, 73, 74, 75, 81, 83, 87, 93, 95, 97, 98, 109, 114, 120, 128, 129, 138, 150, 151, 154, 155, 180, 185, 213

C. I. Pigment Red 5, 7, 12, 22, 38, 48:1, 48:2, 48:4, 49:1, 53:1, 57:1, 63:1, 101, 112, 122, 123, 144, 146, 168, 184, 185, 202

C. I. Pigment Violet 19, 23

C. I. Pigment Blue 1, 2, 3, 15:1, 15:2, 15:3, 15:4, 18, 22, 27, 29, 60

C. I. Pigment Green 7, 36

C. I. Pigment White 6, 18, 21

C. I. Pigment Black 7

The average particle size of the pigment is preferably from 0.08 to 0.5 µm. The maximum particle size of the pigment is from 0.3 to 10 µm, and preferably from 0.3 to 3 µm. By controlling the particle size of the pigment, clogging in the nozzles of the inkjet recording head can be avoided, and ink storage stability, ink transparency, curing sensitivity can be maintained.

The dye which may be contained in the actinic radiation-curable inkjet ink can be an oil soluble dye or the like. Examples of the oil soluble dye include the following various dyes.

Examples of magenta dye include MS Magenta VP, MS magenta HM-1450, HM Magenta HSo-147 (all manufactured by Mitsui-Toatsu Chemicals), AIZEN SOT Red-1, AIZEN SOT Red-2, AIZEN SOT Red-3, AIZEN SOT Pink-1, SPIRON Red GEH SPECIAL (all manufactured by Hodogaya Chemical), RESOLIN Red FB 200%, MACROLEX Red Violet R, MACROLEX ROTSB (all manufactured by of Bayer Japan), KAYASET Red B, KAYASET Red 130, KAYASET Red 802 (all manufactured by Nippon Kayaku), PHLOXIN, ROSE BENGAL, ACID Red (all manufactured by Daiwa Kasei), HSR-31, DIARESIN Red K (all manufactured by Mitsubishi-Kasei), and Oil Red (manufactured by BASF Japan).

Examples of cyan dye include MS Cyan HM-1238, MS Cyan HSo-16, HM Cyan HSo-144, MS Cyan VPG (all manufactured by Mitsui-Toatsu Chemical), AIZEN SOT Blue-4 (manufactured by Hodogaya Chemical Company), RESOLIN BR, Blue BGLN 200%, MACROLEX Blue RR, CERES Blue GN, SIRIUS SUPRA TURQ, Blue Z-BGL, SIRIUS SUPRA TURQ, Blue FB-LL 330% (all manufactured by Bayer Japan), KAYASET Blue FR, KAYASET Blue N, KAYASET Blue 814, Turq Blue GL-5 200, Light Blue BGL-5 200 (all manufactured by Nippon Kayaku), DAIWA Blue 7000, Olosol Fast Blue GL (all manufactured by Daiwa Kasei), DIARESIN Blue P (manufactured by Mitsubishi-Kasei), SUDAN Blue 670, NEOPEN Blue 808, and ZAPON Blue 806 (all manufactured by BASF Japan).

Examples of yellow dye include MS Yellow HSM-41, Yellow KX-7, Yellow EX-27 (Mitsui-Toatsu Chemical), AIZEN SOT Yellow-1, AIZEN SOT Yellow-3, AIZEN SOT Yellow-6 (all manufactured by Hodogaya Chemical), MACROLEX Yellow 6G, MACROLEX FLUOR, Yellow 10GN (all manufactured by Bayer Japan), KAYASET Yellow SF-G, KAYASET Yellow 2G, KAYASET Yellow A-G, KAYASET Yellow E-G (all manufactured by Nippon Kayaku), DAIWA Yellow 330HB (manufactured by of Daiwa Kasei), HSY-68 (manufactured by Mitsubishi-Kasei), SUDAN Yellow 146, and NEOPEN Yellow 075 (all manufactured by BASF Japan).

Examples of Black dye include MS Black VPC (manufactured by Mitsui-Toatsu Chemical), AIZEN SOT Black-1, AIZEN SOT Black-5 (all manufactured by Hodogaya Chemical), RESORIN Black GSN 200%, RESORIN Black BS (all manufactured by Bayer Japan), KAYASET Black SF-G, KAYASET A-N (manufactured by Nippon Kayaku), DAIWA Black MSC (manufactured by Daiwa Kasei), HSB-202 (manufactured by Mitsubishi-Kasei), NEPTUNE Black X60, and NEOPEN Black X58 (all manufactured by BASF Japan).

The content of the pigment or dye is preferably from 0.1 to 20 wt %, and more preferably from 0.4 to 10 wt % relative to the actinic radiation-curable inkjet ink. The reason why the above range is preferable is as follows. When the content of the pigment or dye is excessively low, color exhibition of an image to be obtained is insufficient. On the other hand, when it is excessively high, the ink viscosity is increased to lower the ejection property.

The actinic radiation-curable inkjet ink may contain, as a dispersion promoter, a synergist according to various pigments. The total amount of a dispersant and a dispersion promoter is preferably from 1 to 50 wt % relative to the weight of pigment.

The pigment needs to be dispersed in the actinic radiation-curable inkjet ink. Thus, the actinic radiation-curable inkjet ink is preferably obtained by preparing a pigment dispersion followed by mixing again the pigment dispersion with other ink components.

Preparation of the pigment dispersion is obtained by dispersing a pigment in a dispersion medium. The dispersion of the pigment can be performed by using ball mill, sand mill, Attritor, roll mill, agitator, HENSCEL MIXER, colloid mill, ultrasound homogenizer, pearl mill, wet jet mill, or paint shaker, for example. Furthermore, when dispersing pigment, a dispersant may be added to the system. It is preferable to use a polymeric dispersant, and examples of the polymeric dispersant include SOLSPERSE series of Avecia Biotechnology, Inc., and PB series of Ajinomoto Fine-Techno Co., Inc.

The dispersion medium for the pigment dispersion can be also either a solvent or a photopolymerizable compound. However, since the actinic radiation-curable inkjet ink according to the embodiment preferably undergoes gelation immediately after landing on a recording medium, the dispersion medium is preferably solvent-free. Further, if the solvent remains on a cured image, problems of reduced solvent resistance and the presence VOC in the remaining solvent occur, and thus a solvent-free ink is preferable. Therefore, for the dispersion medium for the pigment dispersion, it is preferable to select a polymerizable compound rather than a solvent, and it is most preferable to select a monomer having the lowest viscosity, in view of adaptability to dispersion.

(Other Components)

The actinic radiation-curable inkjet ink may further contain other components if necessary. Other components can be various additives and other resins. Examples of the additives include surfactants, leveling agents, matting agents, UV absorbers, IR absorbers, antibacterial agents, and basic compounds that serve to increase the storage stability of ink. Examples of the basic compounds include basic alkali metal compounds, basic alkali earth metal compounds, and basic organic compounds such as amines Examples of other resins include resins for adjusting the physical properties of a cured film; examples thereof include polyester resins, polyurethane resins, vinyl resins, acrylic resins, rubber resins, and waxes.

(Sol-Gel Transition Type Inkjet Ink)

Because the actinic radiation-curable inkjet ink contains a gelling agent as described above, it undergoes a temperature-induced reversible sol-gel phase transition. Since a photocurable ink which undergoes sol-gel phase transition is a liquid (sol) at high temperatures (e.g., about 80° C.), the ink can be discharged in a sol state from the inkjet recording head. Once the actinic radiation-curable inkjet ink is discharged at a high temperature, ink droplets (dots) are landed on a recording medium and undergo gelation by natural cooling. Accordingly, combining of neighboring dots is prevented and thus image quality improves.

In order to enhance the ink ejection property, the viscosity of the ink at a high temperature is preferably the same or lower than a predetermined value. Specifically, the viscosity at 80° C. of the actinic radiation-curable inkjet ink is preferably from 3 to 20 mPa·s. In order to prevent combining of neighboring dots, the ink viscosity at room temperature after landing preferably has a certain value or more. Specifically, the viscosity at 25° C. of the actinic radiation-curable inkjet ink is preferably 1,000 mPa·s or more.

The gelation temperature of the ink is preferably 40° C. or higher and 70° C. or lower, and more preferably 50° C. or higher and 65° C. or lower. The reason why the above range is preferable is as follows. In a case where the ejection temperature is near 80° C., when the gelation temperature of the ink exceeds 70° C., gelation easily occurs at the time of ejection thus reducing ejection property. On the other hand, when the gelation temperature is lower than 40° C., the ink after landed on a recording medium does not undergo gelation quickly. The gelation temperature is a temperature when fluidity is lowered by gelation of the ink in a sol state in a process of cooling the sol-state ink.

The viscosity at 80° C. and viscosity and gelation temperature at 25° C. of the ink can be found by measuring a temperature change in dynamic viscoelasticity of the ink using a rheometer. Specifically, when the ink is heated to 100° C. and cooled to 20° C. with conditions including shear rate of 11.7 (1/s) and temperature decrease rate of 0.1° C./s, a temperature change curve of the viscosity is obtained. Further, the viscosity at 80° C. and the viscosity at 25° C. can be obtained by reading each of the viscosities at 80° C. and 25° C. in a temperature change curve of the viscosity. The gelation temperature can be obtained as a temperature at which the viscosity is 200 mPa·s in a temperature change curve of the viscosity.

As for the rheometer, stress control type rheometer Physica MCR300 manufactured by Anton Paar can be used. The size of the corn plate can be 75 mm and the corn angle can be 1.0°.

(Method for Producing Actinic Radiation-Curable Inkjet Ink)

The actinic radiation-curable inkjet ink can be obtained by mixing the aforementioned photocurable compound and components, including, a gelling agent, under heating. Preferably, the actinic radiation-curable inkjet ink is obtained by preparing a pigment dispersion containing a colorant (in particular, pigment) dispersed in part of the photopolymerizable compound and mixing the pigment dispersion with other ink components including other photopolymerizable compound.

(2. Inkjet Recording Apparatus and Image Recording Method Using the Same)

The image recording method according to an embodiment includes at least two steps described below.

(1) A step of attaching an actinic radiation-curable inkjet ink to a recording medium by discharging the photocurable inkjet ink from an inkjet recording head and (2) a step of curing the ink droplets by irradiating the droplets landed on the recoding medium with actinic radiation.

Step (1)

It suffices that the actinic radiation-curable inkjet ink is the inkjet ink described above.

Ink droplets are ejected from an inkjet recording head. To enhance the ink ejection property, the temperature of the inkjet ink inside the inkjet recording head is preferably set such that it is from 10 to 30° C. higher than the gelation temperature. When the ink temperature inside the inkjet recording head is lower than (gelation temperature+10)° C., the ink undergoes gelation inside the inkjet recording head or at the surface of the nozzle, and thus ink ejection property can be easily lowered. On the other hand, when the ink temperature inside the inkjet recording head is higher than (gelation temperature+30)° C., the ink is at excessively high temperature, and thus the ink components may be deteriorated.

Thus, the inkjet ink droplets having the above-described temperature may be discharged after heating the inkjet ink in the inkjet recording head, the inkjet ink in the ink channel connected to the inkjet recording head, or the inkjet ink inside the ink tank connected to the ink channel.

The amount of liquid per droplet discharged from each nozzle of the inkjet recording head may vary depending on the resolution of an image. However, it is preferably from 0.5 to 10 pl, and more preferably from 0.5 to 2.5 pl for forming a high-resolution image. In order to form a high-resolution image with the above-described liquid amount, dissolution stability of the gelling agent in the ink is necessary. In the ink composition according to an embodiment, dissolution stability of the gelling agent can be secured. Accordingly, it is possible to stably form a high-resolution image even with the above-described liquid amount.

The ink droplets landed on a recording medium is cooled and quickly undergoes gelation by sol-gel phase transition. As a result, the ink droplets can be pinned without being scattered.

The recording medium can be either paper or a resin film. Examples of the paper include coated paper for printing and art paper for printing. Further, examples of the resin film include a polyethylene terephthalate film and a vinyl chloride film.

By allowing ink droplets to be discharged from the inkjet recording head, the ink droplets are attached onto a recording medium. The temperature when the ink droplets are landed on the recording medium is preferably set to be from 20 to 60° C. When the temperature of the recording medium is excessively low, the ink droplets undergo gelation and pinned too fast so that leveling of the ink droplets does not occur sufficiently, and as a result, the glossiness of an image may be lowered. On the other hand, when the temperature of the recording medium is excessively high, it is difficult for the ink droplets to undergo gelation, and therefore neighboring dots of the ink droplets may be mixed with each other. By appropriately adjusting the temperature of the recording medium, it is possible to achieve both a moderate level of leveling that does not allow for mixing among neighboring dots of the ink droplets and appropriate pinning.

In the inkjet ink according to an embodiment, since the gelling agent is stably dissolved in the ink solvent (photopolymerizable compound A, photopolymerizable compound B, and photopolymerizable compound C), the glossiness of the image can be adjusted by controlling the temperature of the recording medium. When the gelling agent is not stably present in the ink solvent, some of the gelling agent is precipitated during discharging and thus nozzle clogging occurs. Therefore, the resulting image has defects. In addition, in a case where crystallization of the gelling agent is delayed after the ink is landed on the recording medium, neighboring dots may be mixed together even when the temperature of the recording medium is controlled. Therefore, the resulting image has defects. The surface temperature of the recording medium varies depending on a recording medium, but the surface temperature thereof is controlled to be a temperature preferably lower than the gelation temperature of the ink by 3 to 30° C., and more preferably by 5 to 15° C.

The conveyance speed of the recording medium is preferably from 500 to 2,000 mm/s. As the conveyance speed increases, the image forming speed also increases, and thus desirable. However, when the conveyance speed is excessively high, the image quality is deteriorated or curing of ink droplets become insufficient, for example.

Step (2)

By irradiating the ink droplets landed on a recording medium with actinic radiation, the photopolymerizable compound contained in the ink droplets is crosslinked or polymerized to cure the ink droplets to form an image.

The actinic radiation to be directed on the ink droplets attached to a recording medium is, for example, electron beams, ultraviolet rays, $\alpha$ rays, $\gamma$ rays, and X rays. Ultraviolet rays are preferable. In the case of UV ray irradiation using an LED light source, it is possible to use an LED lamp (8 W/cm$^2$, water cooled unit) manufactured by Heraeus Holding GmbH.

For curing of the ink droplets, an LED as a light source is installed such that it provides UV ray of from 370 to 410 nm wavelength with peak illuminance from 0.5 to 10 W/cm$^2$ and more preferably from 1 to 5 W/cm$^2$ on a surface of the image. The light quantity to be irradiated onto an image is preferably adjusted to be lower than 350 mJ/cm$^2$ in order to limit the irradiation of the ink droplets with radiation heat.

In order to prevent combining of neighboring ink droplets, the light irradiation for ink droplets is preferably performed within 10 seconds, preferably within 0.001 second to 5 seconds, and more preferably within 0.01 second to 2 seconds after the ink droplets are attached to the recording medium. The light irradiation is preferably performed after discharging the ink droplets from all inkjet recording heads that are accommodated in a head carriage.

(Inkjet Recording Apparatus)

The image recording method according to an embodiment can be carried out by using an inkjet recording apparatus of photocurable inkjet type. The inkjet recording apparatus of a photocurable inkjet type includes line recording type (single pass recording type) and serial recording type. Although it may be suitably selected depending on desired resolution or recording speed, the line recording (single pass recording type) is preferred from the viewpoint of high speed recording.

Figure 1B:
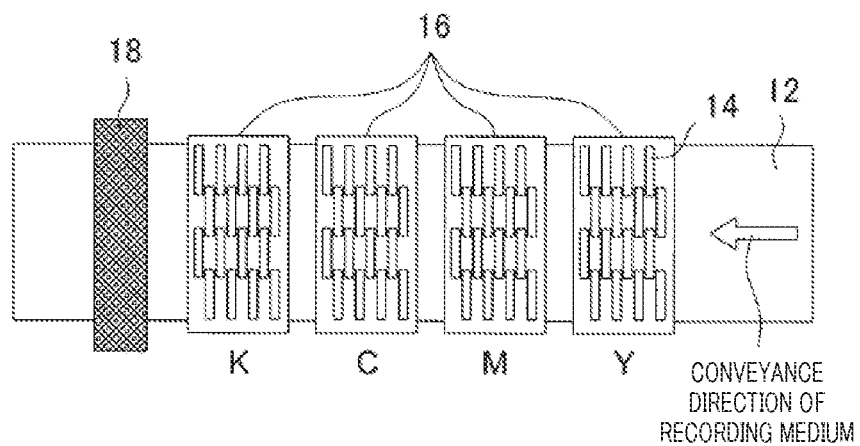

FIGS. 1A and 1B illustrate examples of the configuration of main parts of an inkjet recording apparatus of line recording type. FIG. 1A is a side view and FIG. 1B is a top view.

As illustrated in FIGS. 1A and 1B, inkjet recording apparatus 10 has head carriage 16 for accommodating a plurality of inkjet recording head 14, ink channel 30 connected to head carriage 16, ink tank 31 for storing the ink to be fed via ink channel 30, and Light irradiation section 18 for covering ink tank 31 and the entire width of recording medium 12 and also arranged at a downstream side of head carriage 16 (conveyance direction of the recording medium), and temperature control section 19 installed on a backside of recording medium 12.

Head carriage 16 is fixedly arranged so as to cover the entire width of recording medium 12 and accommodates a plurality of inkjet recording heads 14 that are installed for each color. Inkjet recording head 14 is designed to receive ink. For example, an ink can be supplied directly from a non-illustrated ink cartridge or the like that is added in a freely-mountable manner to inkjet recording apparatus 10 or by non-illustrated means for ink supply.

A plurality of inkjet recording heads 14 is installed for each color in the conveyance direction of recording medium 12. The number of inkjet recording heads 14 that is arranged in the conveyance direction of recording medium 12 is determined based on the nozzle density of inkjet recording head 14 and the resolution of a printed image. For example, when an image having the resolution of 1440×1440 dpi is formed by using inkjet recording head 14 with a drop volume of 2 µl and a nozzle density of 360 dpi, four of inkjet recording head 14 can be arranged in a staggered manner relative to the conveyance direction of recording medium 12. Further, when an image having the resolution of 720×720 dpi is formed by using inkjet recording head 14 with a drop volume of 6 pl and a nozzle density of 360 dpi, two of inkjet recording head 14 can be arranged in a staggered manner. As described herein, dpi represents the number of liquid droplets (dots) per 2.54 cm.

Ink tank 31 is connected to head carriage 16 via ink channel 30. Ink channel 30 is a passage for supplying an ink in ink tank 31 to head carriage 16. For stable discharge of ink droplets, the ink present in ink tank 31, ink channel 30, head carriage 16, and inkjet recording head 14 is heated to a predetermined temperature to maintain the gel state.

Light irradiation section 18 covers the entire width of recording medium 12 and it is arranged at a downstream side of head carriage 16 relative to the conveyance direction of the recording medium. Further, light irradiation section 18 irradiates, with light, the liquid droplets which have been discharged from inkjet recording head 14 and landed on the recording medium so as to cure the liquid droplets.

Temperature control section 19 is installed on a backside of recording medium 12 and it maintains recording medium 12 at a predetermined temperature. Temperature control section 19 can be various heaters or the like, for example.

Hereinafter, the image recording method using inkjet recording apparatus 10 of a line recording type is described. Recording medium 12 is conveyed to a region between head carriage 16 of inkjet recording apparatus 10 and temperature control section 19. Meanwhile, recording medium 12 is adjusted to a predetermined temperature by temperature control section 19. Subsequently, the ink droplets at a high temperature are discharged from inkjet recording head 14 of head carriage 16 and attached to (landed on) recording medium 12. Further, the ink droplets attached to recording medium 12 are cured by irradiation with light using Light irradiation section 18.

The total film thickness of the ink droplet after curing is preferably from 2 to 25 µm. The term "total film thickness of the ink droplet" refers to a maximum value of the film thickness of the ink droplet drawn on a recording medium.

Figure 2:
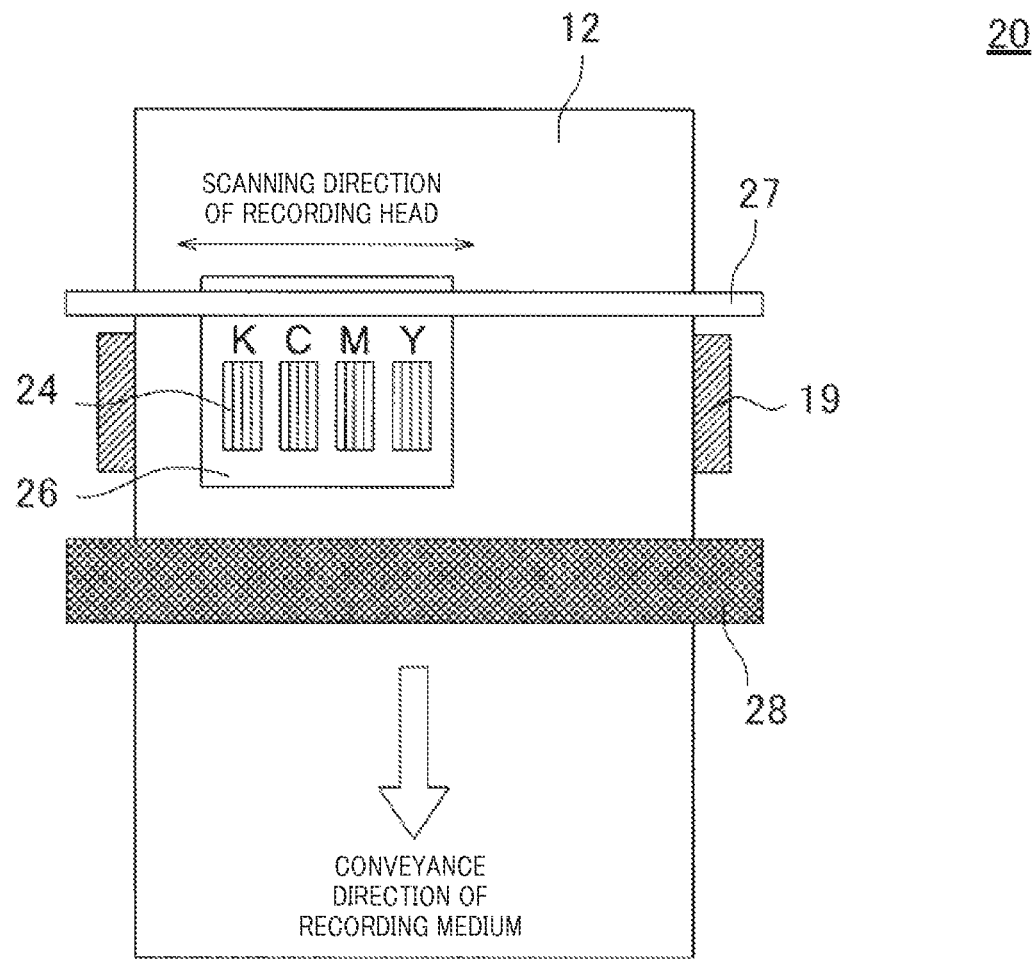
FIG. 2 illustrates an example of the configuration of main parts of an inkjet recording apparatus of serial recording type.

FIG. 2 is a diagram illustrating an example of the configuration of main parts of an inkjet recording apparatus of a serial recording type. As illustrated in FIG. 2, inkjet recording apparatus 20 can be configured in the same manner as that depicted in FIGS. 1A and 1B except that it has head carriage 26 which has a width narrower than the entire width of the recording medium and accommodates a plurality of inkjet recording heads 24 instead of head carriage 16, and guide section 27 for operating head carriage 26 in the width direction of recording medium 12.

In inkjet recording apparatus 20 of serial recording type, head carriage 26 discharges the ink droplets from inkjet recording head 24 accommodated in head carriage 26 while moving along guide section 27 in the width direction of recording medium 12. Once head carriage 26 moves completely in the width direction of recording medium 12 (for each pass), recording medium 12 is delivered in the conveyance direction. Except those operations, the image is recorded in almost the same manner as inkjet recording apparatus 10 of a line recording type that is described above.

EXAMPLES

Hereinafter, the present invention will be described specifically with reference to Examples, but the present invention is not limited to Examples.

<<Preparation of Pigment Dispersion>>

A pigment dispersion was prepared according to the following order. The following two compounds were put into a stainless beaker and heated under stirring for 1 hour to be dissolved while being heated at 65° C. on a hot plate.

Ajisper PB824 (manufactured by Ajinomoto Fine-Techno Co., Inc.) 9 parts by weight Tripropylene glycol diacrylate (APG-200 manufactured by Shin-Nakamura Chemical Co., Ltd.) 71 parts by weight After cooling to room temperature, 20 parts by weight of the pigment described below was added, and put and sealed together with 200 g of zirconia beads having a diameter of 0.5 mm into a glass bottle. After the treatment for dispersion for the hours described below using a paint shaker, zirconia beads were removed.

Pigment 1: Pigment Black 7 (manufactured by Mitsubishi Chemical Company, #52) 5 hours Pigment 2: Pigment Blue 15:4 (manufactured by Dainichiseika Colour & Chemicals Mfg. Co., Ltd., Chromo Fine Blue 6332JC) 5 hours Pigment 3: Pigment Red 122 (manufactured by Dainichiseika Colour & Chemicals Mfg. Co., Ltd., Chromo Fine Red 6112JC) 8 hours Pigment 4: Pigment Yellow 180 (manufactured by Dainichiseika Colour & Chemicals Mfg. Co., Ltd., Chromo Fine Yellow 6280JC) 8 hours <<P reparation of Ink>>

Inks of Examples and Comparative Example were prepared using the prepared pigment dispersions and the following components.

(Photopolymerizable Compound A)

2-Hydroxy butyl acrylate (number of functional groups: 1, light acrylate HOB-A manufactured by KYOEISHA CHEMICAL Co., LTD.)

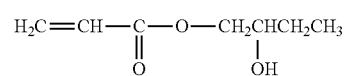

[Chem. 1]

2-Hydroxy-3-phenoxy propyl acrylate (number of functional groups: 1, epoxy ester M-600A, manufactured by KYOEISHA CHEMICAL Co., LTD.)

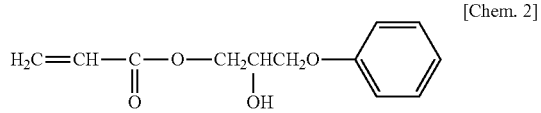

2-Hydroxy-3-acryloyloxypropyl methacrylate (number of functional groups: 2, light acrylate G-201P, manufactured by KYOEISHA CHEMICAL Co., LTD.)

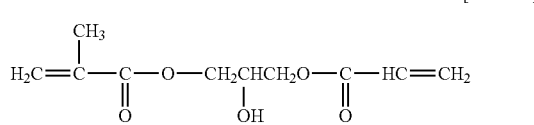

Alicyclic carboxylic acid-based epoxy acrylate (number of functional groups: 2, DA-722, manufactured by Nagase ChemteX Corporation)

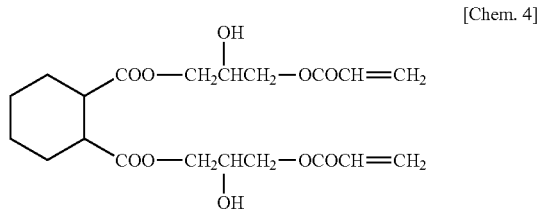

Pentaerythritol triacrylate (number of functional groups: 3, A-TMM-3, manufactured by Shin-Nakamura Chemical Co., Ltd., containing 37 wt % of triacrylate component and 63% of hexaacrylate component)

Pentaerythritol triacrylate (number of functional groups: 3, A-TMM-3LM-N, manufactured by Shin-Nakamura Chemical Co., Ltd., containing 57 wt % of triacrylate component and 43% of hexaacrylate component)

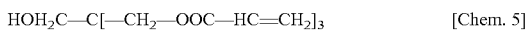

Dipentaerythritol pentaacrylate (Miramer M500, manufactured by Miwon Commercial Co., Ltd.)

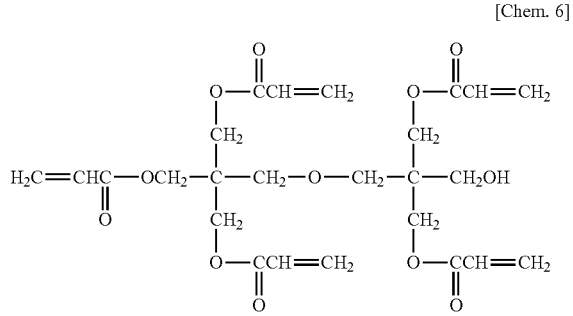

(Photopolymerizable Compound B)
Polyethylene glycol diacrylate (NK ESTER A-400, manufactured by Shin-Nakamura Chemical Co., Ltd., molecular weight: 508)
4EO modified hexanediol diacrylate (CD561, manufactured by Sartomer Company, Inc., molecular weight: 358)
6EO modified trimethylolpropane triacrylate (SR499, manufactured by Sartomer Company, Inc., molecular weight: 560)
(Photopolymerizable Compound C)
3PO modified trimethylolpropane triacrylate (Photomer 4072, manufactured by Cognis, molecular weight: 471, C log P value: 4.90)
(Other Photopolymerizable Compounds)
Pentaerythritol tetraacrylate (A-TMMT, manufactured by Shin-Nakamura Chemical Co., Ltd., molecular weight: 352)

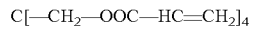

(Gelling Agent)
Distearyl ketone (Kao wax T1, manufactured by Kao Corporation)
Behenyl behenate (UNISTAR M-2222SL, manufactured by NOF Corporation)
(Surfactant)
KF352 (manufactured by Shin-Etsu Chemical Company)
(Photopolymerization Initiator)
DAROCURE TPO (manufactured by BASF)
IRGACURE 819 (manufactured by BASF)
SPEEDCURE ITX (manufactured by DKSH)
(Polymerization Inhibitor)
UV10 (manufactured by BASF)

According to the ink compositions listed in Tables 2 to 10, each component and the above pigment dispersion were mixed and stirred under heating at 80° C. Under heating, the obtained solution was filtered through a 3 μm TEFLON (registered trademark) membrane filter manufactured by Advantec MFS, Inc.

<<Inks of Examples 1 and 2>>
Inks having the compositions shown in Table 2 were prepared. Inks of Examples 1 and 2 are examples prepared by changing the type of monofunctional photopolymerizable compound A.

<<Inks of Examples 3 and 4>>
Inks having the compositions shown in Table 3 were prepared. Inks of Examples 3 and 4 are examples prepared by changing the type of bifunctional photopolymerizable compound A.

<<Inks of Examples 5 to 11>>
Inks having the compositions shown in Table 4 were prepared. Inks of Examples 5 to 11 are examples prepared by changing the type and amount of trifunctional photopolymerizable compound A. Incidentally, the compositions of inks of Examples 8 to 11 are the same.

<<Inks of Examples 12 and 13>>
Inks having the compositions shown in Table 5 were prepared. Inks of Examples 12 and 13 are examples prepared by changing the amount of pentafunctional photopolymerizable compound A.

<<Inks of Comparative Examples 1 to 4>>
Inks having the compositions shown in Table 6 were prepared. Inks of Comparative Examples 1 to 4 are examples prepared by adjusting the content of monofunctional photopolymerizable compound A to be excessively small or excessively large.

<<Inks of Comparative Examples 5 to 8>>
Inks having the compositions shown in Table 7 were prepared. Inks of Comparative Examples 5 to 8 are examples prepared by adjusting the content of bifunctional photopolymerizable compound A to be excessively small and excessively large.

<<Inks of Comparative Examples 9 to 13>>

Inks having the compositions shown in Table 8 were prepared. Inks of Comparative Examples 9 to 12 are examples prepared by adjusting the content of trifunctional photopolymerizable compound A to be excessively small and excessively large. In addition, the ink of Comparative Example 13 has the same composition as those of inks of Examples 8 to 11.

<<Inks of Comparative Examples 14 and 15>>

Inks having the compositions shown in Table 9 were prepared. Inks of Comparative Examples 14 and 15 are examples prepared by adjusting the content of pentafunctional photopolymerizable compound A to be excessively small and excessively large.

<<Inks of Comparative Examples 16 to 22>>

Inks having the compositions shown in Table 10 were prepared. Inks of Comparative Examples 16 and 17 are examples prepared by adjusting the content of photopolymerizable compound C to be excessively small and excessively large. Ink of Comparative Example 18 is an example prepared by containing no gelling agent. Inks of Comparative Examples 19 to 22 are examples prepared by containing no photopolymerizable compound A. On the other hand, Comparative Examples 21 and 22 contain a photopolymerizable compound obtained by esterifying a hydroxyl group of the photopolymerizable compound A of Examples 5 and 6. Note that Comparative Example 19 used the same ink composition as Comparative Examples 20 and Comparative Example 21 used the same ink composition as Comparative Example 22.

TABLE 2

|  |  | Example 1 | | | | Example 2 | | | |
| --- | --- | --- | --- | --- | --- | --- | --- | --- | --- |
|  |  | K | C | M | Y | K | C | M | Y |
| Pigment dispersion | 1 | 12.5 |  |  |  | 12.5 |  |  |  |
|  | 2 |  | 12.5 |  |  |  | 12.5 |  |  |
|  | 3 |  |  | 21.0 |  |  |  | 21.0 |  |
|  | 4 |  |  |  | 15.0 |  |  |  | 15.0 |
| Photopolymerizable compound A | Light acrylate HOB-A (Manufactured by KYOEISHA CHEMICAL Co., LTD.) | 10.0 | 10.0 | 10.0 | 10.0 |  |  |  |  |
|  | Epoxy ester M-600A (Manufactured by KYOEISHA CHEMICAL Co., LTD.) |  |  |  |  | 10.0 | 10.0 | 10.0 | 10.0 |
| Photopolymerizable compound B | NK ESTER A-400 (Manufactured by Shin-Nakamura Chemical Co., Ltd.) | 15.0 | 15.0 | 15.0 | 15.0 | 15.0 | 15.0 | 15.0 | 15.0 |
|  | CD561 (Manufactured by Sartomer Company, Inc.) | 10.0 | 10.0 | 10.0 | 10.0 | 10.0 | 10.0 | 10.0 | 10.0 |
|  | SR499 (Manufactured by Sartomer Company, Inc.) | 22.25 | 22.25 | 13.75 | 19.75 | 22.25 | 22.25 | 13.75 | 19.75 |
| Photopolymerizable compound C | Photomer 4072 (Manufactured by Cognis) | 20.0 | 20.0 | 20.0 | 20.0 | 20.0 | 20.0 | 20.0 | 20.0 |
| Gelling agent | Distearyl ketone (Manufactured by Kao Corporation) | 2.0 | 2.0 | 2.0 | 2.0 | 2.0 | 2.0 | 2.0 | 2.0 |
|  | Behenyl behenate (Manufactured by NOF Corporation) | 1.0 | 1.0 | 1.0 | 1.0 | 1.0 | 1.0 | 1.0 | 1.0 |
| Surfactant | KF352 (Manufactured by Shin-Etsu Chemical Company) | 0.05 | 0.05 | 0.05 | 0.05 | 0.05 | 0.05 | 0.05 | 0.05 |
| Photoinitiator | DAROCURE TPO (Manufactured by BASF) | 3.0 | 3.0 | 3.0 | 3.0 | 3.0 | 3.0 | 3.0 | 3.0 |
|  | IRGACURE 819 (Manufactured by BASF) | 2.0 | 2.0 | 2.0 | 2.0 | 2.0 | 2.0 | 2.0 | 2.0 |
|  | SPEEDCURE ITX (Manufactured by DKSH) | 2.0 | 2.0 | 2.0 | 2.0 | 2.0 | 2.0 | 2.0 | 2.0 |
| Polymerization inhibitor | UV10 (Manufactured by BASF) | 0.2 | 0.2 | 0.2 | 0.2 | 0.2 | 0.2 | 0.2 | 0.2 |

TABLE 3

|  |  | Example 3 | | | | Example 4 | | | |
| --- | --- | --- | --- | --- | --- | --- | --- | --- | --- |
|  |  | K | C | M | Y | K | C | M | Y |
| Pigment dispersion | 1 | 12.5 |  |  |  | 12.5 |  |  |  |
|  | 2 |  | 12.5 |  |  |  | 12.5 |  |  |
|  | 3 |  |  | 21.0 |  |  |  | 21.0 |  |
|  | 4 |  |  |  | 15.0 |  |  |  | 15.0 |
| Photopolymerizable compound A | Light acrylate G-201P (Manufactured by KYOEISHA CHEMICAL Co., LTD.) | 10.0 | 10.0 | 10.0 | 10.0 |  |  |  |  |
|  | DA-722 (Manufactured by Nagase ChemteX Corporation) |  |  |  |  | 5.0 | 5.0 | 5.0 | 5.0 |
| Photopolymerizable compound B | NK ESTER A-400 (Manufactured by Shin-Nakamura Chemical Co., Ltd.) | 15.0 | 15.0 | 15.0 | 15.0 | 15.0 | 15.0 | 15.0 | 15.0 |
|  | CD561 (Manufactured by Sartomer Company, Inc.) | 10.0 | 10.0 | 10.0 | 10.0 | 10.0 | 10.0 | 10.0 | 10.0 |
|  | SR499 (Manufactured by Sartomer Company, Inc.) | 22.25 | 22.25 | 13.75 | 19.75 | 27.25 | 27.25 | 18.75 | 24.75 |

TABLE 3-continued

|  |  | Example 3 | | | | Example 4 | | | |
| --- | --- | --- | --- | --- | --- | --- | --- | --- | --- |
|  |  | K | C | M | Y | K | C | M | Y |
| Photo-polymerizable compound C | Photomer 4072 (Manufactured by Cognis) | 20.0 | 20.0 | 20.0 | 20.0 | 20.0 | 20.0 | 20.0 | 20.0 |
| Gelling agent | Distearyl ketone (Manufactured by Kao Corporation) | 2.0 | 2.0 | 2.0 | 2.0 | 2.0 | 2.0 | 2.0 | 2.0 |
|  | Behenyl behenate (Manufactured by NOF Corporation) | 1.0 | 1.0 | 1.0 | 1.0 | 1.0 | 1.0 | 1.0 | 1.0 |
| Surfactant | KF352 (Manufactured by Shin-Etsu Chemical Company) | 0.05 | 0.05 | 0.05 | 0.05 | 0.05 | 0.05 | 0.05 | 0.05 |
| Photoinitiator | DAROCURE TPO (Manufactured by BASF) | 3.0 | 3.0 | 3.0 | 3.0 | 3.0 | 3.0 | 3.0 | 3.0 |
|  | IRGACURE 819 (Manufactured by BASF) | 2.0 | 2.0 | 2.0 | 2.0 | 2.0 | 2.0 | 2.0 | 2.0 |
|  | SPEEDCURE ITX (Manufactured by DKSH) | 2.0 | 2.0 | 2.0 | 2.0 | 2.0 | 2.0 | 2.0 | 2.0 |
| Polymerization inhibitor | UV10 (Manufactured by BASF) | 0.2 | 0.2 | 0.2 | 0.2 | 0.2 | 0.2 | 0.2 | 0.2 |

TABLE 4

|  |  | Example 5 | | | | Example 6 | | | | Example 7 | |
| --- | --- | --- | --- | --- | --- | --- | --- | --- | --- | --- | --- |
|  |  | K | C | M | Y | K | C | M | Y | K | C |
| Pigment dispersion | 1 | 12.5 |  |  |  | 12.5 |  |  |  | 12.5 |  |
|  | 2 |  | 12.5 |  |  |  | 12.5 |  |  |  | 12.5 |
|  | 3 |  |  | 21.0 |  |  |  | 21.0 |  |  |  |
|  | 4 |  |  |  | 15.0 |  |  |  | 15.0 |  |  |
| Photo-polymerizable compound A | A-TMM-3 (Manufactured by Shin-Nakamura Chemical Co., Ltd.) | 10.0 | 10.0 | 10.0 | 10.0 | 5.0 | 5.0 | 5.0 | 5.0 |  |  |
|  | A-TMM-3LM-N (Manufactured by Shin-Nakamura Chemical Co., Ltd.) |  |  |  |  |  |  |  |  | 10.0 | 10.0 |
| Photo-polymerizable compound B | NK ESTER A-400 (Manufactured by Shin-Nakamura Chemical Co., Ltd.) | 15.0 | 15.0 | 15.0 | 15.0 | 15.0 | 15.0 | 15.0 | 15.0 | 15.0 | 15.0 |
|  | CD561 (Manufactured by Sartomer Company, Inc.) | 10.0 | 10.0 | 10.0 | 10.0 | 10.0 | 10.0 | 10.0 | 10.0 | 10.0 | 10.0 |
|  | SR499 (Manufactured by Sartomer Company, Inc.) | 22.25 | 22.25 | 13.75 | 19.75 | 27.25 | 27.25 | 18.75 | 24.75 | 22.25 | 22.25 |
| Photo-polymerizable compound C | Photomer 4072 (Manufactured by Cognis) | 20.0 | 20.0 | 20.0 | 20.0 | 20.0 | 20.0 | 20.0 | 20.0 | 20.0 | 20.0 |
| Gelling agent | Distearyl ketone (Manufactured by Kao Corporation) | 2.0 | 2.0 | 2.0 | 2.0 | 2.0 | 2.0 | 2.0 | 2.0 | 2.0 | 2.0 |
|  | Behenyl behenate (Manufactured by NOF Corporation) | 1.0 | 1.0 | 1.0 | 1.0 | 1.0 | 1.0 | 1.0 | 1.0 | 1.0 | 1.0 |
| Surfactant | KF352 (Manufactured by Shin-Etsu Chemical Company) | 0.05 | 0.05 | 0.05 | 0.05 | 0.05 | 0.05 | 0.05 | 0.05 | 0.05 | 0.05 |
| Photoinitiator | DAROCURE TPO (Manufactured by BASF) | 3.0 | 3.0 | 3.0 | 3.0 | 3.0 | 3.0 | 3.0 | 3.0 | 3.0 | 3.0 |
|  | IRGACURE 819 (Manufactured by BASF) | 2.0 | 2.0 | 2.0 | 2.0 | 2.0 | 2.0 | 2.0 | 2.0 | 2.0 | 2.0 |
|  | SPEEDCURE ITX (Manufactured by DKSH) | 2.0 | 2.0 | 2.0 | 2.0 | 2.0 | 2.0 | 2.0 | 2.0 | 2.0 | 2.0 |
| Polymerization inhibitor | UV10 (Manufactured by BASF) | 0.2 | 0.2 | 0.2 | 0.2 | 0.2 | 0.2 | 0.2 | 0.2 | 0.2 | 0.2 |

|  |  | Example 7 | | Example 8, 9, 10, 11 | | | |
| --- | --- | --- | --- | --- | --- | --- | --- |
|  |  | M | Y | K | C | M | Y |
| Pigment dispersion | 1 |  |  | 12.5 |  |  |  |
|  | 2 |  |  |  | 12.5 |  |  |
|  | 3 | 21.0 |  |  |  | 21.0 |  |
|  | 4 |  | 15.0 |  |  |  | 15.0 |
| Photo-polymerizable compound A | A-TMM-3 (Manufactured by Shin-Nakamura Chemical Co., Ltd.) |  |  |  |  |  |  |
|  | A-TMM-3LM-N (Manufactured by Shin-Nakamura Chemical Co., Ltd.) | 10.0 | 10.0 | 5.0 | 5.0 | 5.0 | 5.0 |
| Photo-polymerizable compound B | NK ESTER A-400 (Manufactured by Shin-Nakamura Chemical Co., Ltd.) | 15.0 | 15.0 | 15.0 | 15.0 | 15.0 | 15.0 |
|  | CD561 (Manufactured by Sartomer Company, Inc.) | 10.0 | 10.0 | 10.0 | 10.0 | 10.0 | 10.0 |

TABLE 4-continued

| | | | | | | | |
|---|---|---|---|---|---|---|---|
| | | SR499 (Manufactured by Sartomer Company, Inc.) | 13.75 | 19.75 | 27.25 | 27.25 | 18.75 | 24.75 |
| Photo-polymerizable compound C | Photomer 4072 (Manufactured by Cognis) | 20.0 | 20.0 | 20.0 | 20.0 | 20.0 | 20.0 |
| Gelling agent | Distearyl ketone (Manufactured by Kao Corporation) | 2.0 | 2.0 | 2.0 | 2.0 | 2.0 | 2.0 |
| | Behenyl behenate (Manufactured by NOF Corporation) | 1.0 | 1.0 | 1.0 | 1.0 | 1.0 | 1.0 |
| Surfactant | KF352 (Manufactured by Shin-Etsu Chemical Company) | 0.05 | 0.05 | 0.05 | 0.05 | 0.05 | 0.05 |
| Photoinitiator | DAROCURE TPO (Manufactured by BASF) | 3.0 | 3.0 | 3.0 | 3.0 | 3.0 | 3.0 |
| | IRGACURE 819 (Manufactured by BASF) | 2.0 | 2.0 | 2.0 | 2.0 | 2.0 | 2.0 |
| | SPEEDCURE ITX (Manufactured by DKSH) | 2.0 | 2.0 | 2.0 | 2.0 | 2.0 | 2.0 |
| Polymerization inhibitor | UV10 (Manufactured by BASF) | 0.2 | 0.2 | 0.2 | 0.2 | 0.2 | 0.2 |

TABLE 5

| | | Example 12 | | | | Example 13 | | | |
|---|---|---|---|---|---|---|---|---|---|
| | | K | C | M | Y | K | C | M | Y |
| Pigment dispersion | 1 | 12.5 | | | | 12.5 | | | |
| | 2 | | 12.5 | | | | 12.5 | | |
| | 3 | | | 21.0 | | | | 21.0 | |
| | 4 | | | | 15.0 | | | | 15.0 |
| Photo-polymerizable compound A | Miramer M500 (Manufactured by Miwon Commercial Co., Ltd.) | 10.0 | 10.0 | 10.0 | 10.0 | 5.0 | 5.0 | 5.0 | 5.0 |
| Photo-polymerizable compound B | NK ESTER A-400 (Manufactured by Shin-Nakamura Chemical Co., Ltd.) | 15.0 | 15.0 | 15.0 | 15.0 | 15.0 | 15.0 | 15.0 | 15.0 |
| | CD561 (Manufactured by Sartomer Company, Inc.) | 10.0 | 10.0 | 10.0 | 10.0 | 10.0 | 10.0 | 10.0 | 10.0 |
| | SR499 (Manufactured by Sartomer Company, Inc.) | 22.25 | 22.25 | 13.75 | 19.75 | 27.25 | 27.25 | 18.75 | 24.75 |
| Photo-polymerizable compound C | Photomer 4072 (Manufactured by Cognis) | 20.0 | 20.0 | 20.0 | 20.0 | 20.0 | 20.0 | 20.0 | 20.0 |
| Gelling agent | Distearyl ketone (Manufactured by Kao Corporation) | 2.0 | 2.0 | 2.0 | 2.0 | 2.0 | 2.0 | 2.0 | 2.0 |
| | Behenyl behenate (Manufactured by NOF Corporation) | 1.0 | 1.0 | 1.0 | 1.0 | 1.0 | 1.0 | 1.0 | 1.0 |
| Surfactant | KF352 (Manufactured by Shin-Etsu Chemical Company) | 0.05 | 0.05 | 0.05 | 0.05 | 0.05 | 0.05 | 0.05 | 0.05 |
| Photo initiator | DAROCURE TPO (Manufactured by BASF) | 3.0 | 3.0 | 3.0 | 3.0 | 3.0 | 3.0 | 3.0 | 3.0 |
| | IRGACURE 819 (Manufactured by BASF) | 2.0 | 2.0 | 2.0 | 2.0 | 2.0 | 2.0 | 2.0 | 2.0 |
| | SPEEDCURE ITX (Manufactured by DKSH) | 2.0 | 2.0 | 2.0 | 2.0 | 2.0 | 2.0 | 2.0 | 2.0 |
| Polymerization inhibitor | UV10 (Manufactured by BASF) | 0.2 | 0.2 | 0.2 | 0.2 | 0.2 | 0.2 | 0.2 | 0.2 |

TABLE 6

| | | Comparative Example 1 | | | | Comparative Example 2 | | | | Comparative Example 3 | |
|---|---|---|---|---|---|---|---|---|---|---|---|
| | | K | C | M | Y | K | C | M | Y | K | C |
| Pigment dispersion | 1 | 12.5 | | | | 12.5 | | | | 12.5 | |
| | 2 | | 12.5 | | | | 12.5 | | | | 12.5 |
| | 3 | | | 21.0 | | | | 21.0 | | | |
| | 4 | | | | 15.0 | | | | 15.0 | | |
| Photo-polymerizable compound A | Light acrylate HOB-A (Manufactured by KYOEISHA CHEMICAL Co., LTD.) | 0.8 | 0.8 | 0.8 | 0.8 | | | | | 20.0 | 20.0 |
| | Epoxy ester M-600A (Manufactured by KYOEISHA CHEMICAL Co., LTD.) | | | | | 0.8 | 0.8 | 0.8 | 0.8 | | |

TABLE 6-continued

| | | | | | | | | | | | |
|---|---|---|---|---|---|---|---|---|---|---|---|
| Photo-polymerizable compound B | NK ESTER A-400 (Manufactured by Shin-Nakamura Chemical Co., Ltd.) | 15.0 | 15.0 | 15.0 | 15.0 | 15.0 | 15.0 | 15.0 | 15.0 | 15.0 | 15.0 |
| | CD561 (Manufactured by Sartomer Company, Inc.) | 10.0 | 10.0 | 10.0 | 10.0 | 10.0 | 10.0 | 10.0 | 10.0 | 10.0 | 10.0 |
| | SR499 (Manufactured by Sartomer Company, Inc.) | 31.45 | 31.45 | 22.95 | 28.95 | 31.45 | 31.45 | 22.95 | 28.95 | 12.25 | 12.25 |
| Photo-polymerizable compound C | Photomer 4072 (Manufactured by Cognis) | 20.0 | 20.0 | 20.0 | 20.0 | 20.0 | 20.0 | 20.0 | 20.0 | 20.0 | 20.0 |
| Gelling agent | Distearyl ketone (Manufactured by Kao Corporation) | 2.0 | 2.0 | 2.0 | 2.0 | 2.0 | 2.0 | 2.0 | 2.0 | 2.0 | 2.0 |
| | Behenyl behenate (Manufactured by NOF Corporation) | 1.0 | 1.0 | 1.0 | 1.0 | 1.0 | 1.0 | 1.0 | 1.0 | 1.0 | 1.0 |
| Surfactant | KF352 (Manufactured by Shin-Etsu Chemical Company) | 0.05 | 0.05 | 0.05 | 0.05 | 0.05 | 0.05 | 0.05 | 0.05 | 0.05 | 0.05 |
| Photoinitiator | DAROCURE TPO (Manufactured by BASF) | 3.0 | 3.0 | 3.0 | 3.0 | 3.0 | 3.0 | 3.0 | 30 | 3.0 | 3.0 |
| | IRGACURE 819 (Manufactured by BASF) | 2.0 | 2.0 | 2.0 | 2.0 | 2.0 | 2.0 | 2.0 | 2.0 | 2.0 | 2.0 |
| | SPEEDCURE ITX (Manufactured by DKSH) | 2.0 | 2.0 | 2.0 | 2.0 | 2.0 | 2.0 | 2.0 | 2.0 | 2.0 | 2.0 |
| Polymerization inhibitor | UV10 (Manufactured by BASF) | 0.2 | 0.2 | 0.2 | 0.2 | 0.2 | 0.2 | 0.2 | 0.2 | 0.2 | 0.2 |

| | | | Comparative Example 3 | | Comparative Example 4 | | | |
|---|---|---|---|---|---|---|---|---|
| | | | M | Y | K | C | M | Y |
| Pigment dispersion | 1 | | | | 12.5 | | | |
| | 2 | | | | | 12.5 | | |
| | 3 | | 21.0 | | | | 21.0 | |
| | 4 | | | 15.0 | | | | 15.0 |
| Photo-polymerizable compound A | Light acrylate HOB-A (Manufactured by KYOEISHA CHEMICAL Co., LTD.) | | 20.0 | 20.0 | | | | |
| | Epoxy ester M-600A (Manufactured by KYOEISHA CHEMICAL Co., LTD.) | | | | 20.0 | 20.0 | 20.0 | 20.0 |
| Photo-polymerizable compound B | NK ESTER A-400 (Manufactured by Shin-Nakamura Chemical Co., Ltd.) | | 15.0 | 15.0 | 150 | 15.0 | 15.0 | 15.0 |
| | CD561 (Manufactured by Sartomer Company, Inc.) | | 10.0 | 10.0 | 10.0 | 10.0 | 10.0 | 10.0 |
| | SR499 (Manufactured by Sartomer Company, Inc.) | | 3.75 | 9.75 | 12.25 | 12.25 | 3.75 | 9.75 |
| Photo-polymerizable compound C | Photomer 4072 (Manufactured by Cognis) | | 20.0 | 20.0 | 20.0 | 20.0 | 20.0 | 20.0 |
| Gelling agent | Distearyl ketone (Manufactured by Kao Corporation) | | 2.0 | 2.0 | 2.0 | 2.0 | 2.0 | 2.0 |
| | Behenyl behenate (Manufactured by NOF Corporation) | | 1.0 | 1.0 | 1.0 | 1.0 | 1.0 | 1.0 |
| Surfactant | KF352 (Manufactured by Shin-Etsu Chemical Company) | | 0.05 | 0.05 | 0.05 | 0.05 | 0.05 | 0.05 |
| Photoinitiator | DAROCURE TPO (Manufactured by BASF) | | 3.0 | 3.0 | 30 | 3.0 | 3.0 | 3.0 |
| | IRGACURE 819 (Manufactured by BASF) | | 2.0 | 2.0 | 2.0 | 2.0 | 2.0 | 2.0 |
| | SPEEDCURE ITX (Manufactured by DKSH) | | 2.0 | 2.0 | 2.0 | 2.0 | 2.0 | 2.0 |
| Polymerization inhibitor | UV10 (Manufactured by BASF) | | 0.2 | 0.2 | 0.2 | 0.2 | 0.2 | 0.2 |

TABLE 7

| | | Comparative Example 5 | | | | Comparative Example 6 | | | | Comparative Example 7 | | | | Comparative Example 8 | | | |
|---|---|---|---|---|---|---|---|---|---|---|---|---|---|---|---|---|---|
| | | K | C | M | Y | K | C | M | Y | K | C | M | Y | K | C | M | Y |
| Pigment dispersion | 1 | 12.5 | | | | 12.5 | | | | 12.5 | | | | 12.5 | | | |
| | 2 | | 12.5 | | | | 12.5 | | | | 12.5 | | | | 12.5 | | |
| | 3 | | | 21.0 | | | | 21.0 | | | | 21.0 | | | | 21.0 | |
| | 4 | | | | 15.0 | | | | 15.0 | | | | 15.0 | | | | 15.0 |
| Photo-polymerizable compound A | Light acrylate G-201P (Manufactured by KYOEISHA CHEMICAL Co., LTD.) | 0.8 | 0.8 | 0.8 | 0.8 | | | | | 20.0 | 20.0 | 20.0 | 20.0 | | | | |
| | DA-722 (Manufactured by Nagase ChemteX Corporation) | | | | | 0.8 | 0.8 | 0.8 | 0.8 | | | | | 20.0 | 20.0 | 20.0 | 20.0 |
| Photo-polymerizable compound B | NK ESTER A-400 (Manufactured by Shin-Nakamura Chemical Co., Ltd.) | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 |
| | CD561 (Manufactured by Sartomer Company, Inc.) | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| | SR499 (Manufactured by Sartomer Company, Inc.) | 31.45 | 31.45 | 22.95 | 28.95 | 31.45 | 31.45 | 22.95 | 28.95 | 12.25 | 12.25 | 3.75 | 9.75 | 12.25 | 12.25 | 3.75 | 9.75 |
| Photo-polymerizable compound C | Photomer 4072 (Manufactured by Cognis) | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Gelling agent | Distearyl ketone (Manufactured by Kao Corporation) | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| | Behenyl behenate (Manufactured by NOF Corporation) | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Surfactant | KF352 (Manufactured by Shin-Etsu Chemical Company) | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Photoinitiator | DAROCURE TPO (Manufactured by BASF) | 3.0 | 3.0 | 3.0 | 3.0 | 3.0 | 3.0 | 3.0 | 3.0 | 3.0 | 3.0 | | | | | | |
| | IRGACURE 819 (Manufactured by BASF) | 2.0 | 2.0 | 2.0 | 2.0 | 2.0 | 2.0 | 2.0 | 2.0 | 2.0 | 2.0 | | | | | | |
| | SPEEDCURE ITX (Manufactured by DKSH) | 2.0 | 2.0 | 2.0 | 2.0 | 2.0 | 2.0 | 2.0 | 2.0 | 2.0 | 2.0 | | | | | | |
| Polymerization inhibitor | UV10 (Manufactured by BASF) | 0.2 | 0.2 | 0.2 | 0.2 | 0.2 | 0.2 | 0.2 | 0.2 | 0.2 | 0.2 | | | | | | |

TABLE 7-continued

|  |  |  |  |  |  |  |  |
|---|---|---|---|---|---|---|---|
| Photoinitiator | DAROCURE TPO (Manufactured by BASF) | 3.0 | 3.0 | 3.0 | 3.0 | 3.0 | 3.0 |
|  | IRGACURE 819 (Manufactured by BASF) | 2.0 | 2.0 | 2.0 | 2.0 | 2.0 | 2.0 |
|  | SPEEDCURE ITX (Manufactured by DKSH) | 2.0 | 2.0 | 2.0 | 2.0 | 2.0 | 2.0 |
| Polymerization inhibitor | UV10 (Manufactured by BASF) | 0.2 | 0.2 | 0.2 | 0.2 | 0.2 | 0.2 |

TABLE 8

|  |  |  | Comparative Example 9 | | | | Comparative Example 10 | | | | Comparative Example 11 | | | |
|---|---|---|---|---|---|---|---|---|---|---|---|---|---|---|
|  |  |  | K | C | M | Y | K | C | M | Y | K | C | M | Y |
| Pigment dispersion | 1 |  | 12.5 |  |  |  | 12.5 |  |  |  | 12.5 |  |  |  |
|  | 2 |  |  | 12.5 |  |  |  | 12.5 |  |  |  | 12.5 |  |  |
|  | 3 |  |  |  | 21.0 |  |  |  | 21.0 |  |  |  | 21.0 |  |
|  | 4 |  |  |  |  | 15.0 |  |  |  | 15.0 |  |  |  | 15.0 |
| Photo-polymerizable compound A | A-TMM-3 (Manufactured by Shin-Nakamura Chemical Co., Ltd.) | 0.8 | 0.8 | 0.8 | 0.8 |  |  |  |  | 42.0 | 42.0 | 42.0 | 42.0 |
|  | A-TMM-3LM-N (Manufactured by Shin-Nakamura Chemical Co., Ltd.) |  |  |  |  | 0.8 | 0.8 | 0.8 | 0.8 |  |  |  |  |
| Photo-polymerizable compound B | NK ESTER A-400 (Manufactured by Shin-Nakamura Chemical Co., Ltd.) | 15.0 | 15.0 | 15.0 | 15.0 | 15.0 | 15.0 | 15.0 | 15.0 | 10.0 | 10.0 | 10.0 | 10.0 |
|  | CD561 (Manufactured by Sartomer Company, Inc.) | 10.0 | 10.0 | 10.0 | 10.0 | 10.0 | 10.0 | 10.0 | 10.0 | 5.0 | 5.0 | 5.0 | 5.0 |
|  | SR499 (Manufactured by Sartomer Company, Inc.) | 31.5 | 31.5 | 23 | 29 | 31.5 | 31.5 | 23 | 29 | 10.25 | 10.25 | 1.75 | 7.75 |
| Photo-polymerizable compound C | Photomer 4072 (Manufactured by Cognis) | 20.0 | 20.0 | 20.0 | 20.0 | 20.0 | 20.0 | 20.0 | 20.0 | 10.0 | 10.0 | 10.0 | 10.0 |
| Gelling agent | Distearyl ketone (Manufactured by Kao Corporation) | 2.0 | 2.0 | 2.0 | 2.0 | 2.0 | 2.0 | 2.0 | 2.0 | 2.0 | 2.0 | 2.0 | 2.0 |
|  | Behenyl behenate (Manufactured by NOF Corporation) | 1.0 | 1.0 | 1.0 | 1.0 | 1.0 | 1.0 | 1.0 | 1.0 | 1.0 | 1.0 | 1.0 | 1.0 |
| Surfactant | KF352 (Manufactured by Shin-Etsu Chemical Company) | 0.05 | 0.05 | 0.05 | 0.05 | 0.05 | 0.05 | 0.05 | 0.05 | 0.05 | 0.05 | 0.05 | 0.05 |
| Photoinitiator | DAROCURE TPO (Manufactured by BASF) | 3.0 | 3.0 | 3.0 | 3.0 | 3.0 | 3.0 | 3.0 | 3.0 | 3.0 | 3.0 | 3.0 | 3.0 |
|  | IRGACURE 819 (Manufactured by BASF) | 2.0 | 2.0 | 2.0 | 2.0 | 2.0 | 2.0 | 2.0 | 2.0 | 2.0 | 2.0 | 2.0 | 2.0 |
|  | SPEEDCURE ITX (Manufactured by DKSH) | 2.0 | 2.0 | 2.0 | 2.0 | 2.0 | 2.0 | 2.0 | 2.0 | 2.0 | 2.0 | 2.0 | 2.0 |
| Polymerization inhibitor | UV10 (Manufactured by BASF) | 0.2 | 0.2 | 0.2 | 0.2 | 0.2 | 0.2 | 0.2 | 0.2 | 0.2 | 0.2 | 0.2 | 0.2 |

|  |  |  | Comparative Example 12 | | | | Comparative Example 13 | | | |
|---|---|---|---|---|---|---|---|---|---|---|
|  |  |  | K | C | M | Y | K | C | M | Y |
| Pigment dispersion | 1 |  | 12.5 |  |  |  | 12.5 |  |  |  |
|  | 2 |  |  | 12.5 |  |  |  | 12.5 |  |  |
|  | 3 |  |  |  | 21.0 |  |  |  | 21.0 |  |
|  | 4 |  |  |  |  | 15.0 |  |  |  | 15.0 |
| Photo-polymerizable compound A | A-TMM-3 (Manufactured by Shin-Nakamura Chemical Co., Ltd.) |  |  |  |  |  |  |  |  |  |
|  | A-TMM-3LM-N (Manufactured by Shin-Nakamura Chemical Co., Ltd.) | 30.0 | 30.0 | 30.0 | 30.0 | 5.0 | 5.0 | 5.0 | 5.0 |
| Photo-polymerizable compound B | NK ESTER A-400 (Manufactured by Shin-Nakamura Chemical Co., Ltd.) | 10.0 | 10.0 | 10.0 | 10.0 | 15.0 | 15.0 | 15.0 | 15.0 |
|  | CD561 (Manufactured by Sartomer Company, Inc.) | 5.0 | 5.0 | 5.0 | 5.0 | 10.0 | 10.0 | 10.0 | 10.0 |
|  | SR499 (Manufactured by Sartomer Company, Inc.) | 22.25 | 22.25 | 13.75 | 19.75 | 27.25 | 27.25 | 18.75 | 24.75 |

TABLE 8-continued

| | | | | | | | | | | |
|---|---|---|---|---|---|---|---|---|---|---|
| Photo-polymerizable compound C | Photomer 4072 (Manufactured by Cognis) | 10.0 | 10.0 | 10.0 | 10.0 | 20.0 | 20.0 | 20.0 | 20.0 |
| Gelling agent | Distearyl ketone (Manufactured by Kao Corporation) | 2.0 | 2.0 | 2.0 | 2.0 | 2.0 | 2.0 | 2.0 | 2.0 |
| | Behenyl behenate (Manufactured by NOF Corporation) | 1.0 | 1.0 | 1.0 | 1.0 | 1.0 | 1.0 | 1.0 | 1.0 |
| Surfactant | KF352 (Manufactured by Shin-Etsu Chemical Company) | 0.05 | 0.05 | 0.05 | 0.05 | 0.05 | 0.05 | 0.05 | 0.05 |
| Photoinitiator | DAROCURE TPO (Manufactured by BASF) | 3.0 | 3.0 | 3.0 | 3.0 | 3.0 | 3.0 | 3.0 | 3.0 |
| | IRGACURE 819 (Manufactured by BASF) | 2.0 | 2.0 | 2.0 | 2.0 | 2.0 | 2.0 | 2.0 | 2.0 |
| | SPEEDCURE ITX (Manufactured by DKSH) | 2.0 | 2.0 | 2.0 | 2.0 | 2.0 | 2.0 | 2.0 | 2.0 |
| Polymerization inhibitor | UV10 (Manufactured by BASF) | 0.2 | 0.2 | 0.2 | 0.2 | 0.2 | 0.2 | 0.2 | 0.2 |

TABLE 9

| | | Comparative Example 14 | | | | Comparative Example 15 | | | |
|---|---|---|---|---|---|---|---|---|---|
| | | K | C | M | Y | K | C | M | Y |
| Pigment dispersion | 1 | 12.5 | | | | 12.5 | | | |
| | 2 | | 12.5 | | | | 12.5 | | |
| | 3 | | | 21.0 | | | | 21.0 | |
| | 4 | | | | 15.0 | | | | 15.0 |
| Photo-polymerizable compound A | Miramer M500 (Manufactured by Miwon Commercial Co., Ltd.) | 0.8 | 0.8 | 0.8 | 0.8 | 20.0 | 20.0 | 20.0 | 20.0 |
| Photo-polymerizable compound B | NK ESTER A-400 (Manufactured by Shin-Nakamura Chemical Co., Ltd.) | 15.0 | 15.0 | 15.0 | 15.0 | 15.0 | 15.0 | 15.0 | 15.0 |
| | CD561 (Manufactured by Sartomer Company, Inc.) | 10.0 | 10.0 | 10.0 | 10.0 | 10.0 | 10.0 | 10.0 | 10.0 |
| | SR499 (Manufactured by Sartomer Company, Inc.) | 31.45 | 31.45 | 22.95 | 28.95 | 12.25 | 12.25 | 3.75 | 9.75 |
| Photo-polymerizable compound C | Photomer 4072 (Manufactured by Cognis) | 20.0 | 20.0 | 20.0 | 20.0 | 20.0 | 20.0 | 20.0 | 20.0 |
| Gelling agent | Distearyl ketone (Manufactured by Kao Corporation) | 2.0 | 2.0 | 2.0 | 2.0 | 2.0 | 2.0 | 2.0 | 2.0 |
| | Behenyl behenate (Manufactured by NOF Corporation) | 1.0 | 1.0 | 1.0 | 1.0 | 1.0 | 1.0 | 1.0 | 1.0 |
| Surfactant | KF352 (Manufactured by Shin-Etsu Chemical Company) | 0.05 | 0.05 | 0.05 | 0.05 | 0.05 | 0.05 | 0.05 | 0.05 |
| Photoinitiator | DAROCURE TPO (Manufactured by BASF) | 3.0 | 3.0 | 3.0 | 3.0 | 3.0 | 3.0 | 3.0 | 3.0 |
| | IRGACURE 819 (Manufactured by BASF) | 2.0 | 2.0 | 2.0 | 2.0 | 2.0 | 2.0 | 2.0 | 2.0 |
| | SPEEDCURE ITX (Manufactured by DKSH) | 2.0 | 2.0 | 2.0 | 2.0 | 2.0 | 2.0 | 2.0 | 2.0 |
| Polymerization inhibitor | UV10 (Manufactured by BASF) | 0.2 | 0.2 | 0.2 | 0.2 | 0.2 | 0.2 | 0.2 | 0.2 |

TABLE 10

| | | Comparative Example 16 | | | | Comparative Example 17 | | | | Comparative Example 18 | | | |
|---|---|---|---|---|---|---|---|---|---|---|---|---|---|
| | | K | C | M | Y | K | C | M | Y | K | C | M | Y |
| Pigment dispersion | 1 | 12.5 | | | | 12.5 | | | | 12.5 | | | |
| | 2 | | 12.5 | | | | 12.5 | | | | 12.5 | | |
| | 3 | | | 21.0 | | | | 21.0 | | | | 21.0 | |
| | 4 | | | | 15.0 | | | | 15.0 | | | | 15.0 |
| Photo-polymerizable compound A | A-TMM-3LM-N (Manufactured by Shin-Nakamura Chemical Co., Ltd.) | 10.0 | 10.0 | 10.0 | 10.0 | 10.0 | 10.0 | 10.0 | 10.0 | 10.0 | 10.0 | 10.0 | 10.0 |
| Photo-polymerizable compound B | NK ESTER A-400 (Manufactured by Shin-Nakamura Chemical Co., Ltd.) | 15.0 | 15.0 | 15.0 | 15.0 | 10.0 | 10.0 | 10.0 | 10.0 | 15.0 | 15.0 | 15.0 | 15.0 |

TABLE 10-continued

| | | | | | | | | | | | | | | |
|---|---|---|---|---|---|---|---|---|---|---|---|---|---|---|
| | CD561 (Manufactured by Sartomer Company, Inc.) | 10.0 | 10.0 | 10.0 | 10.0 | 5.0 | 5.0 | 5.0 | 5.0 | 10.0 | 10.0 | 10.0 | 10.0 |
| | SR499 (Manufactured by Sartomer Company, Inc.) | 34.3 | 34.3 | 25.8 | 31.8 | 2.25 | 2.25 | 0.75 | 1.75 | 25.25 | 25.25 | 16.75 | 22.75 |
| Photo-polymerizable compound C | Photomer 4072 (Manufactured by Cognis) | 8.0 | 8.0 | 8.0 | 8.0 | 50.0 | 50.0 | 43.0 | 48.0 | 20.0 | 20.0 | 20.0 | 20.0 |
| Other Photo-polymerizable compounds | A-TMMT (Manufactured by Shin-Nakamura Chemical Co., Ltd.) | | | | | | | | | | | | |
| Gelling agent | Distearyl ketone (Manufactured by Kao Corporation) | 2.0 | 2.0 | 2.0 | 2.0 | 2.0 | 2.0 | 2.0 | 2.0 | | | | |
| | Behenyl behenate (Manufactured by NOF Corporation) | 1.0 | 1.0 | 1.0 | 1.0 | 1.0 | 1.0 | 1.0 | 1.0 | | | | |
| Surfactant | KF352 (Manufactured by Shin-Etsu Chemical Company) | 0.05 | 0.05 | 0.05 | 0.05 | 0.05 | 0.05 | 0.05 | 0.05 | 0.05 | 0.05 | 0.05 | 0.05 |
| Photoinitiator | DAROCURE TPO (Manufactured by BASF) | 3.0 | 3.0 | 3.0 | 3.0 | 3.0 | 3.0 | 3.0 | 3.0 | 3.0 | 3.0 | 3.0 | 3.0 |
| | IRGACURE 819 (Manufactured by BASF) | 2.0 | 2.0 | 2.0 | 2.0 | 2.0 | 2.0 | 2.0 | 2.0 | 2.0 | 2.0 | 2.0 | 2.0 |
| | SPEEDCURE ITX (Manufactured by DKSH) | 2.0 | 2.0 | 2.0 | 2.0 | 2.0 | 2.0 | 2.0 | 2.0 | 2.0 | 2.0 | 2.0 | 2.0 |
| Polymerization inhibitor | UV10 (Manufactured by BASF) | 0.2 | 0.2 | 0.2 | 0.2 | 0.2 | 0.2 | 0.2 | 0.2 | 0.2 | 0.2 | 0.2 | 0.2 |

| | | | Comparative Example 19, 20 | | | | Comparative Example 21, 22 | | | |
|---|---|---|---|---|---|---|---|---|---|---|
| | | | K | C | M | Y | K | C | M | Y |
| Pigment dispersion | 1 | | 12.5 | | | | 12.5 | | | |
| | 2 | | | 12.5 | | | | 12.5 | | |
| | 3 | | | | 21.0 | | | | 21.0 | |
| | 4 | | | | | 15.0 | | | | 15.0 |
| Photo-polymerizable compound A | A-TMM-3LM-N (Manufactured by Shin-Nakamura Chemical Co., Ltd.) | | | | | | | | | |
| Photo-polymerizable compound B | NK ESTER A-400 (Manufactured by Shin-Nakamura Chemical Co., Ltd.) | | 15.0 | 15.0 | 15.0 | 15.0 | 15.0 | 15.0 | 15.0 | 15.0 |
| | CD561 (Manufactured by Sartomer Company, Inc.) | | 10.0 | 10.0 | 10.0 | 10.0 | 10.0 | 10.0 | 10.0 | 10.0 |
| | SR499 (Manufactured by Sartomer Company, Inc.) | | 32.25 | 32.25 | 23.75 | 29.75 | 22.25 | 22.25 | 13.75 | 19.75 |
| Photo-polymerizable compound C | Photomer 4072 (Manufactured by Cognis) | | 20.0 | 20.0 | 20.0 | 20.0 | 20.0 | 20.0 | 20.0 | 20.0 |
| Other Photo-polymerizable compounds | A-TMMT (Manufactured by Shin-Nakamura Chemical Co., Ltd.) | | | | | | 10.0 | 10.0 | 10.0 | 10.0 |
| Gelling agent | Distearyl ketone (Manufactured by Kao Corporation) | | 2.0 | 2.0 | 2.0 | 2.0 | 2.0 | 2.0 | 2.0 | 2.0 |
| | Behenyl behenate (Manufactured by NOF Corporation) | | 1.0 | 1.0 | 1.0 | 1.0 | 1.0 | 1.0 | 1.0 | 1.0 |
| Surfactant | KF352 (Manufactured by Shin-Etsu Chemical Company) | | 0.05 | 0.05 | 0.05 | 0.05 | 0.05 | 0.05 | 0.05 | 0.05 |
| Photoinitiator | DAROCURE TPO (Manufactured by BASF) | | 3.0 | 3.0 | 3.0 | 3.0 | 3.0 | 3.0 | 3.0 | 3.0 |
| | IRGACURE 819 (Manufactured by BASF) | | 2.0 | 2.0 | 2.0 | 2.0 | 2.0 | 2.0 | 2.0 | 2.0 |
| | SPEEDCURE ITX (Manufactured by DKSH) | | 2.0 | 2.0 | 2.0 | 2.0 | 2.0 | 2.0 | 2.0 | 2.0 |
| Polymerization inhibitor | UV10 (Manufactured by BASF) | | 0.2 | 0.2 | 0.2 | 0.2 | 0.2 | 0.2 | 0.2 | 0.2 |

<<Inkjet Image Forming Method>>

Each of the ink compositions prepared in Examples and Comparative Examples was loaded in an inkjet recording apparatus having an inkjet recording head equipped with piezo type inkjet nozzles. Using this apparatus, image recording was performed on A4-sized coated paper (OK TOP COAT, manufactured by Oji Paper Co., Ltd., basis weight: 105 g/m$^2$) and cast coated paper (mirror coat platinum, manufactured by Oji Paper Co., Ltd., basis weight: 110 g/m$^2$).

The ink supplying system was composed of an ink tank, an ink channel, a sub-ink tank immediately before the inkjet recording head, filter-attached piping, and a piezo head. The area from the ink tank to the head portion was warmed to 90° C. by heating. The piezo head was warmed by heating using a heater disposed inside the head so as to make the ink temperature in the head be 80° C. At the piezo head, a voltage was applied such that liquid droplets of 3 µl would be obtained, and the discharge was made by using four heads at a resolution of 360 dpi for each color. Thus, letters at 1440×1440 dpi, a solid image of YMCK having an attached amount of 7.5 g/m² per one color, a solid image of BGR secondary colors having an attached amount of 15 g/m², and a natural image were printed.

After printing, an LED lamp (8 W/cm², water cooled unit) manufactured by Heraeus Holding GmbH was installed at a height of 50 mm from a base material and irradiation was performed such that the ink was cured (width of irradiation in the conveyance direction: 44 mm) The conveyance speed of the recording medium was 500 mm/s or 1,000 mm/s.

The recording media were warmed to 45, 50, 55, 60 or 65° C. by heating.

<<Image Quality Evaluation>>
<Evaluation of Letter Quality>

According to the above method, letters of Chinese character "動" were printed in 3-point and 5-point MS Mincho font using each color ink on coated paper for printing (OK TOP COAT, manufactured by Oji Paper Co., Ltd., basis weight: 105 g/m²) and cast coated paper (mirror coat platinum, manufactured by Oji Paper Co., Ltd., basis weight: 110 g/m²). The printed letters were visually observed and evaluation was performed according to the following criteria.

A: The detail of 3-point letter is reproducible without collapse of the detail.

B: The detail of 3-point letter on cast coated paper is slightly collapsed but the detail thereof on coated paper is reproducible without collapse of the detail.

C: The details of 3-point letters on both base materials are collapsed, but 5-point letters are reproducible without collapse of the details.

D: The details of 5-point letters on both base materials are collapsed.

<Evaluation of Graininess>

According to the above method, natural images (high-resolution color digital standard image data "fruit basket" issued by Japanese Standards Association) were printed using each color ink on coated paper for printing (OK TOP COAT, manufactured by Oji Paper Co., Ltd., basis weight: 105 g/m²) and cast coated paper (mirror coat platinum, manufactured by Oji Paper Co., Ltd., basis weight: 110 g/m²). The printed images were visually observed and evaluation was performed according to the following criteria.

B: Granular feeling is not recognized in the image when the image is observed at a position 15 cm apart from the image.

C: Granular feeling is recognized in parts of image when the image is observed at a position 15 cm apart from the image, but granular feeling is not recognized in the image when the image is observed at a position 30 cm apart from the image.

D: Granular feeling is recognized in the image when the image is observed at a position 30 cm apart from the image.

<<Curability Evaluation>>
<Evaluation of Scratch Resistance>

According to the above method, solid images of YMCK-BGR were printed on coated paper for printing (OK TOP COAT, manufactured by Oji Paper Co., Ltd., basis weight: 105 g/m²) and the printed solid images were scratched with one's nails. Thereafter, an extent of blank of images was visually observed and evaluation was performed according to the following criteria.

B: For all colors, absolutely no blank is recognized in the images.

C: Some blanks are recognized in the images of G and K, but the blanks are practically acceptable.

D: Obvious blanks are recognized in the images of G, K, and Y, and the image quality is a practically intolerable level.

<Evaluation of Rub Resistance>

According to the above method, solid images of YMCK-BGR were printed on coated paper for printing (OK TOP COAT, manufactured by Oji Paper Co., Ltd., basis weight: 105 g/m²). In accordance with the method described in "JIS Standards K5701-1 6.2.3 Rub Resistance Test", a sheet of coated paper for printing A cut in a size of 4 cm² was placed on the image, a load of 500 g was applied thereon, and the paper sheet was rubbed against the image. Thereafter, an extent of decrease in the density of the image was visually observed and evaluation was performed according to the following criteria.

B: Even though the image is rubbed 30 strokes or more with the paper sheet, absolutely no change is recognized in the image.

C: Decrease in the density of the image is recognized at the time when the image has been rubbed 30 strokes, but the decrease is a practically acceptable level.

D: Obvious decrease in the density of the image is recognized at the time when the image has been rubbed fewer than 30 strokes, and the decrease is a practically intolerable level.

<Evaluation of Adhesiveness>

According to the above method, solid images of YMCK-BGR were printed on coated paper for printing (OK TOP COAT, manufactured by Oji Paper Co., Ltd., basis weight: 105 g/m²). A piece of Scotch tape (manufactured by Sumitomo 3M Ltd.) brought into sufficiently close contact with portions of the printed solid image obtained by cross-cutting the image into 100 squares with a 1 mm interval. An extent of peeling when the tape was peeled off at an angle of 90° was evaluated according to the following criteria.

B: Absolutely no peeling in all of 100 squares is recognized in all colors.

C: Peeling in 1 to 49 squares of the image is recognized in the images of G and K.

D: Peeling in 50 to 100 squares of the image is recognized in the images of G and K, and the image quality is a practically intolerable level.

<Evaluation of Surface Curability>

According to the above method, solid images of YMCK-BGR were printed on coated paper for printing (OK TOP COAT, manufactured by Oji Paper Co., Ltd., basis weight: 105 g/m²) and the printed solid images were rubbed with one's finger immediately after printing. The change in the image surface was visually observed and evaluation was performed according to the following criteria.

B: For all colors, absolutely no change in the image surface is recognized.

C: Rubbed traces can be confirmed in the images of C and B, but the rubbed trace is a practically acceptable level.

D: Rubbed traces can be confirmed in all colors. Color migration of the pigment in the images of C and B is recognized and the image quality is a practically intolerable level.

<<Solubility Evaluation of Gelling Agent>>

<Evaluation of Solubility>

Inks of Examples and Comparative Examples were left to stand at 100° C. for two hours. Thereafter, a dissolution state and a gelation state after the inks were allowed to stand at room temperature for two hours were visually observed.

B: Ink was uniformly dissolved at 100° C., and after the inks were allowed to stand at room temperature, uniform gel is formed.

D: Ink was separated in an oil bead form at 100° C., or after the inks were allowed to stand at room temperature, separation between the solvent and the solid content occurs.

-: Ink failed to undergo gelation.

The image forming method and results of the image formation evaluation are shown in Table 11.

TABLE 11

| Ink composition | Conveyance speed (mm/s) | Recording medium temperature (° C.) | Image quality evaluation | | Curability evaluation | | | | Gelling agent Solubility |
|---|---|---|---|---|---|---|---|---|---|
| | | | Quality of letters | Graininess | Scratch resistance | Rubfastness | Adhesiveness | Surface curability | |
| Example 1 | 1000 | 45 | A | B | B | C | B | C | B |
| Example 2 | 1000 | 45 | A | B | B | C | B | C | B |
| Example 3 | 1000 | 45 | A | B | B | B | B | B | B |
| Example 4 | 1000 | 45 | A | B | B | B | B | B | B |
| Example 5 | 1000 | 45 | A | B | C | B | B | B | B |
| Example 6 | 1000 | 45 | A | B | C | B | C | B | B |
| Example 7 | 1000 | 45 | A | B | C | B | B | B | B |
| Example 8 | 1000 | 50 | A | B | B | B | B | B | B |
| Example 9 | 1000 | 55 | B | C | B | B | B | B | B |
| Example 10 | 1000 | 60 | C | C | B | C | B | C | B |
| Example 11 | 1000 | 45 | A | B | B | B | B | B | B |
| Example 12 | 1000 | 45 | A | B | B | B | C | B | B |
| Example 13 | 1000 | 45 | A | B | B | B | B | B | B |
| Comparative Example 1 | 1000 | 45 | B | C | C | C | C | C | B |
| Comparative Example 2 | 1000 | 45 | B | C | C | C | C | C | B |
| Comparative Example 3 | 1000 | 45 | C | D | C | C | C | C | D |
| Comparative Example 4 | 1000 | 45 | C | D | C | C | C | C | D |
| Comparative Example 5 | 1000 | 45 | B | C | D | C | D | B | B |
| Comparative Example 6 | 1000 | 45 | B | C | D | C | D | B | B |
| Comparative Example 7 | 1000 | 45 | C | D | B | C | B | C | D |
| Comparative Example 8 | 1000 | 45 | C | D | B | C | B | C | D |
| Comparative Example 9 | 1000 | 45 | B | C | D | C | D | B | B |
| Comparative Example 10 | 1000 | 45 | B | C | D | C | D | B | B |
| Comparative Example 11 | 1000 | 45 | C | D | B | C | B | C | D |
| Comparative Example 12 | 1000 | 45 | C | D | B | C | B | C | D |
| Comparative Example 13 | 1000 | 65 | D | D | D | D | D | D | B |
| Comparative Example 14 | 1000 | 45 | B | C | D | C | D | B | B |
| Comparative Example 15 | 1000 | 45 | C | D | B | C | B | C | D |
| Comparative Example 16 | 1000 | 45 | C | D | B | C | B | C | D |
| Comparative Example 17 | 1000 | 45 | D | D | B | B | B | B | B |
| Comparative Example 18 | 500 | 45 | D | D | D | D | D | D | — |
| Comparative Example 19 | 500 | 45 | B | B | C | B | B | B | B |
| Comparative Example 20 | 1000 | 45 | B | C | D | C | D | B | B |
| Comparative Example 21 | 500 | 45 | B | B | C | B | B | B | B |
| Comparative Example 22 | 1000 | 45 | B | C | D | C | D | B | B |

In the examples (Comparative Examples 1, 2, 5, 6, 9, 10, and 14) in which the content of the polymerizable compound A is excessively small, the evaluation of letter quality is lowered when compared with the examples (Examples 1 to 7 and 11 to 13) having the same temperature condition of the recording medium as the above-mentioned Comparative Examples. This is because a balance between dissolution and crystallization of the gelling agent is not maintained and therefore pinning properties of ink droplets landed on the recording medium are low. Thus, defect and/or blurring are considered to occur.

In the examples (Comparative Examples 3, 4, 7, 8, 11, 12, and 15) in which the content of the polymerizable compound A is excessively large, the evaluations of solubility and graininess of the gelling agent are lowered. The reason is considered that the gelling agent cannot be dissolved in the photopolymerizable compound A having a hydroxyl group, which is a hydrophilic group, and thus the gelling agent is precipitated.

In the example (Comparative Example 13) in which the setting temperature of the recording medium is high, all evaluation results are degraded. The reason is considered that, since the temperature of the recording medium is high after the ink droplets are landed on the recording medium, the gelling agent of the ink droplets landed on the recording medium is difficult to be crystallized.

In the example (Comparative Example 18) in which the gelling agent is not contained, all evaluation results are degraded. The reason is considered that the ink droplets cannot be pinned after the ink droplets are landed on the recording medium. In a case where the gelling agent is not contained, even when the conveyance speed of the recording medium is low (500 mm/s), all evaluation items are lowered.

In the examples (Comparative Examples 19 to 22) in which the photopolymerizable compound A is not contained, when the conveyance speed of the recording medium is low (500 mm/s), obvious decrease in the evaluation results is not recognized. However, when the conveyance speed is high (1,000 mm/s), scratch resistance and adhesiveness are lowered. The reason is considered that, since the gelling agent in the ink is difficult to be crystallized, pinning of the ink droplets landed on the recording medium is delayed.

That is, it is understood that a high-resolution image can be stably formed even in high-speed recording through the means of the present invention, and an actinic radiation-curable inkjet ink having satisfactory adaptability to various recording media can be provided. It is also understood that an image forming method using the actinic radiation-curable inkjet ink can be provided. In particular, in a case where the polymerizable compound A is polyfunctional, curability of the image surface is increased and thus rubfastness of image is enhanced. Under the same condition of the conveyance speed and temperature of the recording medium, the examples (Examples 3 to 7 and 11 to 13) having the polyfunctional photopolymerizable compound A have satisfactory rubfastness compared to the examples (Examples 1 and 2) having the monofunctional photopolymerizable compound A.

The present application claims the priority based on prior Japanese patent applications filed by the same applicant, that is, Japanese Patent Application No. 2011-277211 (filing date of Dec. 19, 2011), and the content of those specifications are all incorporated herein by reference as a part of the present invention.

INDUSTRIAL APPLICABILITY

According to the present invention, it is possible to provide an actinic radiation-curable inkjet ink that confer gelation stability to the gelling agent and high curability to ink droplets, and an image forming method using the same. Moreover, it is possible to stably form a high-resolution image even in high-speed printing and to provide satisfactory image fastness.

REFERENCE SIGNS LIST

10, 20 Inkjet recording apparatus
12 Recording medium
14, 24 Inkjet recording head
16, 26 Head carriage
18, 28 Light irradiation section
19 Temperature control section
27 Guide section
30 Ink channel
31 Ink tank

The invention claimed is:

1. An actinic radiation-curable inkjet ink that undergoes temperature-induced reversible sol-gel phase transition, the actinic radiation-curable inkjet ink comprising a colorant, a gelling agent, a photopolymerizable compound, and a photopolymerization initiator, wherein
    the photopolymerizable compound includes a photopolymerizable compound A, which is a (meth)acrylate compound having a hydroxyl group; a photopolymerizable compound B, which is a (meth)acrylate compound having a molecular weight in a range from 300 to 1,500 and having 3 to 14 structures each represented by ($-CH_2-CH_2-O-$) in a molecule; and a photopolymerizable compound C, which is a (meth)acrylate compound having a molecular weight in a range from 280 to 1,500 and having a C log P value in a range from 4.0 to 7.0,
    the photopolymerizable compound A is contained in an amount in a range from 1 to 15 wt % relative to a total weight of the ink,
    the photopolymerizable compound B is contained in an amount in a range from 30 to 70 wt % relative to the total weight of the ink,
    the photopolymerizable compound C is contained in an amount in a range from 10 to 40 wt % relative to the total weight of the ink, and
    the gelling agent is contained in an amount in a range from 2 to 10 wt % relative to the total weight of the ink.

2. The actinic radiation-curable inkjet ink according to claim 1, wherein the number of polymerizable functional groups of the photopolymerizable compound A is two or more.

3. The actinic radiation-curable inkjet ink according to claim 1, wherein the photopolymerizable compound C is at least one (meth)acrylate compound selected from the following compounds (1) and (2):
    (1) a trifunctional or higher-functional (meth)acrylate compound having 3 to 14 structures each represented by ($-CH_2-CH_2-O-$) in the molecule, and
    (2) a bifunctional or higher-functional (meth)acrylate compound having a cyclic structure in the molecule.

4. The actinic radiation-curable inkjet ink according to claim 1, wherein:
    the gelling agent is at least one compound selected from compounds represented by the following Formulas (G1) and (G2):

$$R1\text{-}CO\text{-}R2, \text{ and} \qquad \text{Formula (G1):}$$

$$R3\text{-}COO\text{-}R4 \qquad \text{Formula (G2):}$$

(where R1 to R4 each independently represent an alkyl chain which has a straight-chain moiety with 12 or more carbon atoms and also may have a branch).

5. An image forming method using the actinic radiation-curable inkjet ink according to claim 1, the method comprising:

attaching ink droplets of the actinic radiation-curable inkjet ink to a recording medium by discharging the ink droplets from an inkjet recording head; and curing the ink droplets landed on the recoding medium by irradiating the ink droplets with actinic radiation, wherein a temperature of the recording medium when the actinic radiation-curable inkjet ink is landed on the recording medium is set to be in a range from 20° C. to 60° C.

6. The actinic radiation-curable inkjet ink according to claim 1, wherein:

the photopolymerizable compound A is a compound represented by the following Formula (I):

$$(Z)_n\text{-R4-OH} \quad (1)$$

wherein Z represents $CH_2=CR1\text{-COO}-$, n represents an integer of from 1 to 3, R1 represents a hydrogen atom or a methyl group, and R4 represents an organic residue having from 2 to 20 carbon atoms.

7. The actinic radiation-curable inkjet ink according to claim 6, wherein:

the photopolymerizable compound A is selected from the group consisting of 2-hydroxyethyl(meth)acrylate, 3-hydroxypropyl(meth)acrylate, 1-methyl-2-hydroxyethyl(meth)acrylate, 2-hydroxypropyl(meth)acrylate, 4-hydroxybutyl(meth)acrylate, 4-hydroxycyclohexyl(meth)acrylate, 5-hydroxypentyl(meth)acrylate, 6-hydroxyhexyl(meth)acrylate, 4-hydroxymethyl cyclohexyl methyl(meth)acrylate, p-hydroxymethyl phenylmethyl(meth)acrylate, 2-(hydroxyethoxy)ethyl (meth)acrylate, 2-(hydroxyethoxyethoxy)ethyl(meth) acrylate, 2-(hydroxyethoxyethoxyethoxy)ethyl(meth) acrylate, and 2-hydroxy-3-phenoxypropyl acrylate.

8. The actinic radiation-curable inkjet ink according to claim 1, wherein:

the photopolymerizable compound B is selected from the group consisting of 4EO modified hexanediol diacrylate, 3EO modified trimethylolpropane triacrylate, 4EO modified pentaerythritol tetraacrylate, 6EO modified trimethylolpropane triacrylate, polyethylene glycol diacrylate, polyethylene glycol dimethacrylate, and tetraethylene glycol diacrylate.

9. The actinic radiation-curable inkjet ink according to claim 1, wherein:

the photopolymerizable compound C is selected from the group consisting of 3PO modified trimethylolpropane triacrylate, 3PO modified trimethylolpropane triacrylate, tricyclodecane dimethanol diacrylate, tricyclodecane dimethanol dimethacrylate and 1,10-decanediol dimethacrylate.

10. The actinic radiation-curable inkjet ink according to claim 1, wherein:

the actinic radiation-curable inkjet ink further comprises a tertiary amine compound or an aromatic tertiary amine compound.

11. The actinic radiation-curable inkjet ink according to claim 1, wherein:

the actinic radiation-curable inkjet ink further comprises a polymerization inhibitor.

12. An image forming method using the actinic radiation-curable inkjet ink according to claim 5, a temperature of the inkjet ink inside a inkjet recording head is set such that it is from 10 to 30° C. higher than the gelation temperature of the inkjet ink.

13. An image forming method using the actinic radiation-curable inkjet ink according to claim 5, an amount of liquid per droplet discharged from each nozzle of the inkjet recording head is from 0.5 to 10 pl.

14. An image forming method using the actinic radiation-curable inkjet ink according to claim 5, a conveyance speed of the recording medium is from 500 to 2,000 mm/s.

15. The actinic radiation-curable inkjet ink according to claim 1, wherein:

the photopolymerization initiator is an intramolecular bond cleaving type photopolymerization initiator or an intramolecular hydrogen withdrawing type photopolymerization initiator.

\* \* \* \* \*